(12) United States Patent
Narvaez et al.

(10) Patent No.: US 9,329,900 B2
(45) Date of Patent: May 3, 2016

(54) HETERGENEOUS PROCESSOR APPARATUS AND METHOD

(71) Applicant: Intel Corporation, Santa Clara, CA (US)

(72) Inventors: Paolo Narvaez, Wayland, MA (US); Ganapati N. Srinivasa, Portland, OR (US); Eugene Gorbatov, Hillsboro, OR (US); Dheeraj R. Subbareddy, Hillsboro, OR (US); Mishali Naik, Santa Clara, CA (US); Alon Naveh, Ramat Hasharon (IL); Abirami Prabhakaran, Hillsboro, OR (US); Eliezer Weissmann, Haifa (IL); David A. Koufaty, Portland, OR (US); Paul Brett, Hillsboro, OR (US); Scott D. Hahn, Beaverton, OR (US); Andrew J. Herdrich, Hillsboro, OR (US); Ravishankar Iyer, Portland, OR (US); Nagabhushan Chitlur, Portland, OR (US); Inder M. Sodhi, Folsom, CA (US); Gaurav Khanna, Hillsboro, OR (US); Russell J. Fenger, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 257 days.

(21) Appl. No.: 13/730,539

(22) Filed: Dec. 28, 2012

(65) Prior Publication Data

US 2014/0189704 A1 Jul. 3, 2014

(51) Int. Cl.
*G06F 9/50* (2006.01)
*G06F 9/455* (2006.01)
*G06F 15/80* (2006.01)

(52) U.S. Cl.
CPC .......... *G06F 9/5044* (2013.01); *G06F 9/45533* (2013.01); *G06F 9/5077* (2013.01); *G06F 9/5094* (2013.01); *G06F 15/80* (2013.01); *Y02B 60/142* (2013.01)

(58) Field of Classification Search
None
See application file for complete search history.

(56) References Cited

U.S. PATENT DOCUMENTS

| 6,341,347 B1 | 1/2002 | Joy et al. |
| 7,272,517 B1 | 9/2007 | Brey |

(Continued)

FOREIGN PATENT DOCUMENTS

| WO | 96-35177 A1 | 11/1996 |
| WO | 2012-134431 A1 | 10/2012 |

OTHER PUBLICATIONS

Freeh et al., "Scaling and packing on a chip multiprocessor", 2007, IEEE, pp. 1-8.*

(Continued)

*Primary Examiner* — Qing Wu
(74) *Attorney, Agent, or Firm* — Nicholson De Vos Webster & Elliott LLP

(57) ABSTRACT

A heterogeneous processor architecture is described. For example, a processor according to one embodiment of the invention comprises: a first set of one or more physical processor cores having first processing characteristics; a second set of one or more physical processor cores having second processing characteristics different from the first processing characteristics; virtual-to-physical (V-P) mapping logic to expose a plurality of virtual processors to software, the plurality of virtual processors to appear to the software as a plurality of homogeneous processor cores, the software to allocate threads to the virtual processors as if the virtual processors were homogeneous processor cores; wherein the V-P mapping logic is to map each virtual processor to a physical processor within the first set of physical processor cores or the second set of physical processor cores such that a thread allocated to a first virtual processor by software is executed by a physical processor mapped to the first virtual processor from the first set or the second set of physical processors.

25 Claims, 24 Drawing Sheets

(56) References Cited

U.S. PATENT DOCUMENTS

| | | | |
|---|---|---|---|
| 7,634,650 B1 | 12/2009 | Shah et al. | |
| 7,797,512 B1* | 9/2010 | Cheng et al. | 712/10 |
| 7,802,073 B1 | 9/2010 | Cheng et al. | |
| 7,822,941 B2 | 10/2010 | Vick et al. | |
| 9,032,226 B2 | 5/2015 | Kumar et al. | |
| 2004/0024987 A1 | 2/2004 | Lentz et al. | |
| 2005/0013705 A1 | 1/2005 | Farkas et al. | |
| 2005/0268048 A1 | 12/2005 | Hofstee et al. | |
| 2006/0004942 A1 | 1/2006 | Hetherington et al. | |
| 2006/0156042 A1 | 7/2006 | Desai et al. | |
| 2006/0236135 A1 | 10/2006 | Jones | |
| 2009/0177864 A1 | 7/2009 | Moreton et al. | |
| 2009/0309243 A1 | 12/2009 | Carmack et al. | |
| 2010/0186010 A1* | 7/2010 | Chalemin | G06F 9/5077 718/1 |
| 2010/0318761 A1 | 12/2010 | Moyer et al. | |
| 2011/0057937 A1 | 3/2011 | Wu et al. | |
| 2012/0060171 A1 | 3/2012 | Bobroff et al. | |
| 2012/0079290 A1 | 3/2012 | Kumar et al. | |
| 2012/0084777 A1 | 4/2012 | Jayamohan | |
| 2012/0134320 A1 | 5/2012 | Khawer et al. | |
| 2012/0144217 A1 | 6/2012 | Sistla et al. | |
| 2012/0317568 A1 | 12/2012 | Aasheim | |
| 2013/0132972 A1 | 5/2013 | Sur et al. | |
| 2013/0155081 A1 | 6/2013 | Khodorkovsky et al. | |
| 2013/0160003 A1* | 6/2013 | Mann | G06F 9/5088 718/1 |
| 2013/0185570 A1 | 7/2013 | Kumar et al. | |
| 2014/0100706 A1 | 4/2014 | Khatri et al. | |

OTHER PUBLICATIONS

PCT/US2013/046634 Notification of Transmittal of the International Search Report and the Written Opinion of the International Searching Authority, or the Declaration, Mailed Aug. 30, 2013, 12 pages.

International Preliminary Report on Patentability for International Application No. PCT/US2013/046634, mailed Jul. 9, 2015, 9 pages.

Non-Final Office Action for U.S. Appl. No. 13/730,493, mailed Apr. 13, 2015, 9 pages.

Final Office Action for U.S. Appl. No. 13/730,493, mailed Nov. 16, 2015, 10 pages.

PCT/US2013/047434 Notification of Transmittal of the International Search Report and the Written Opinion of the International Searching Authority, or the Declaration, mailed Oct. 10, 2013, 11 pages.

International Preliminary Report on Patentability for International Application No. PCT/US2013/047434, mailed Jul. 9, 2015, 8 pages.

Non-Final Office Action for U.S. Appl. No. 13/730,491, mailed Sep. 25, 2015, 9 pages.

International Search Report and Written Opinion of the International Searching Authority for International Application No. PCT/US2013/047700, mailed Sep. 27, 2013, 9 pages.

International Preliminary Report on Patentability for International Application No. PCT/US2013/047700, mailed Jul. 9, 2015, 6 pages.

Non-Final Office Action for U.S. Appl. No. 13/730,565, mailed Sep. 8, 2015, 13 pages.

International Search Report and Written Opinion for Application No. PCT/US2013/048352, mailed Nov. 1, 2013, 12 pages.

International Preliminary Report on Patentability for Application No. PCT/US2013/048352, mailed Jul. 9, 2015, 6 pages.

\* cited by examiner

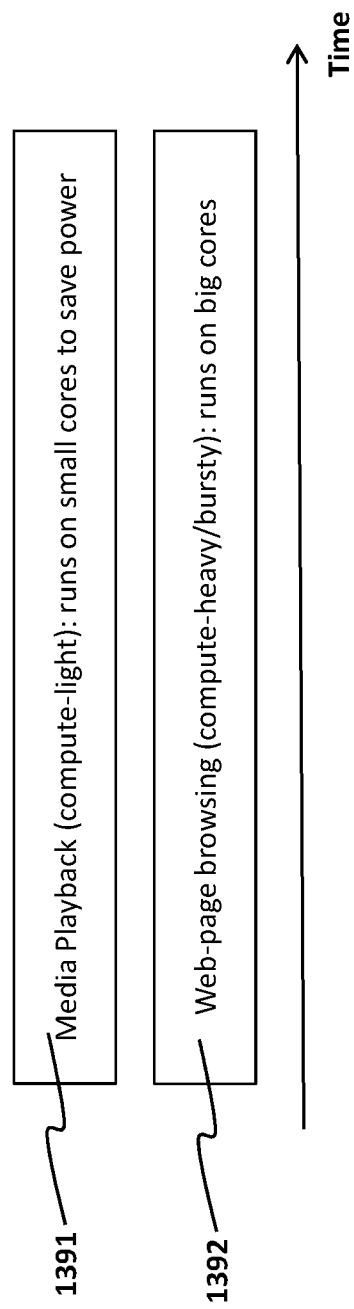

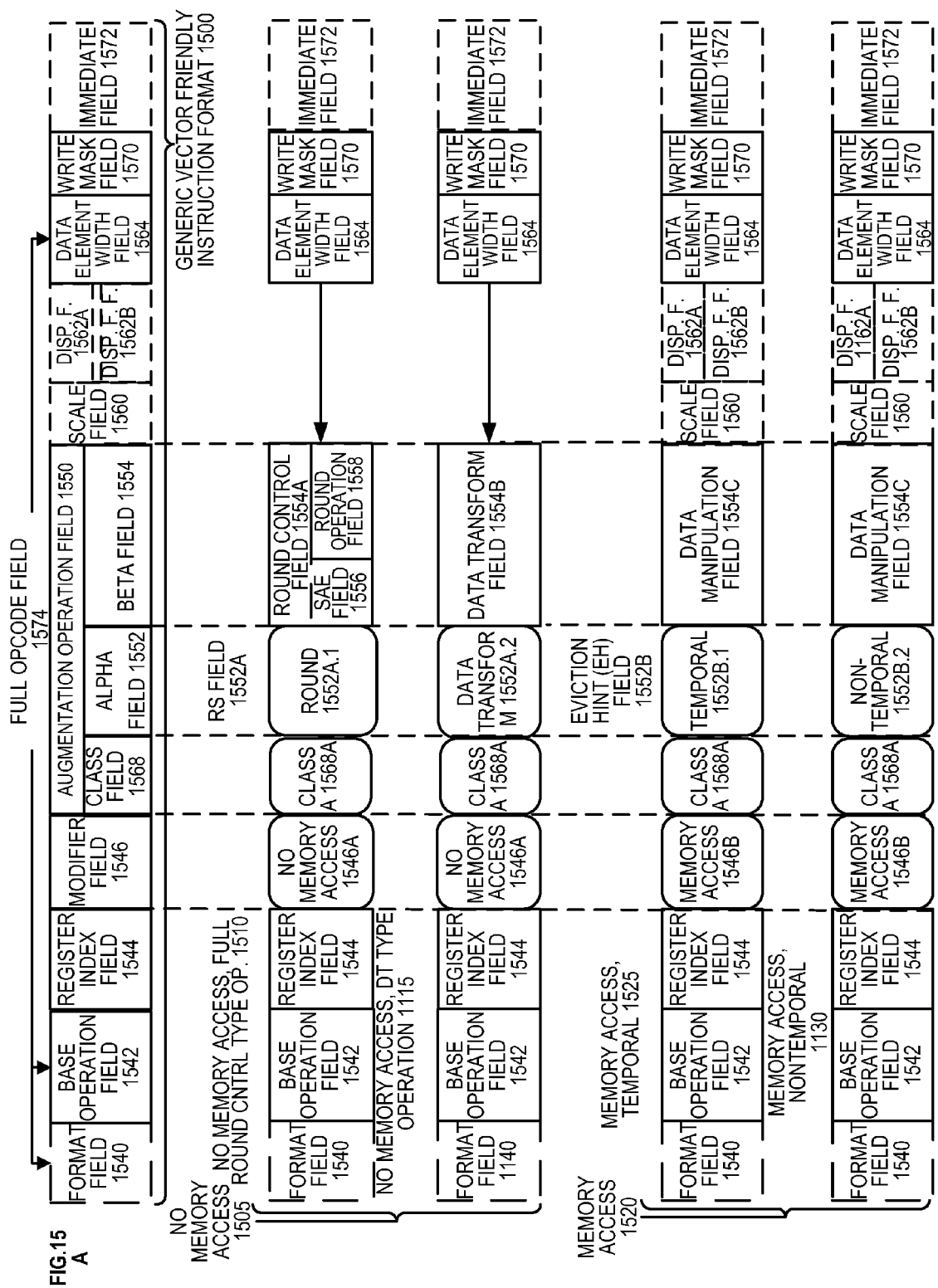

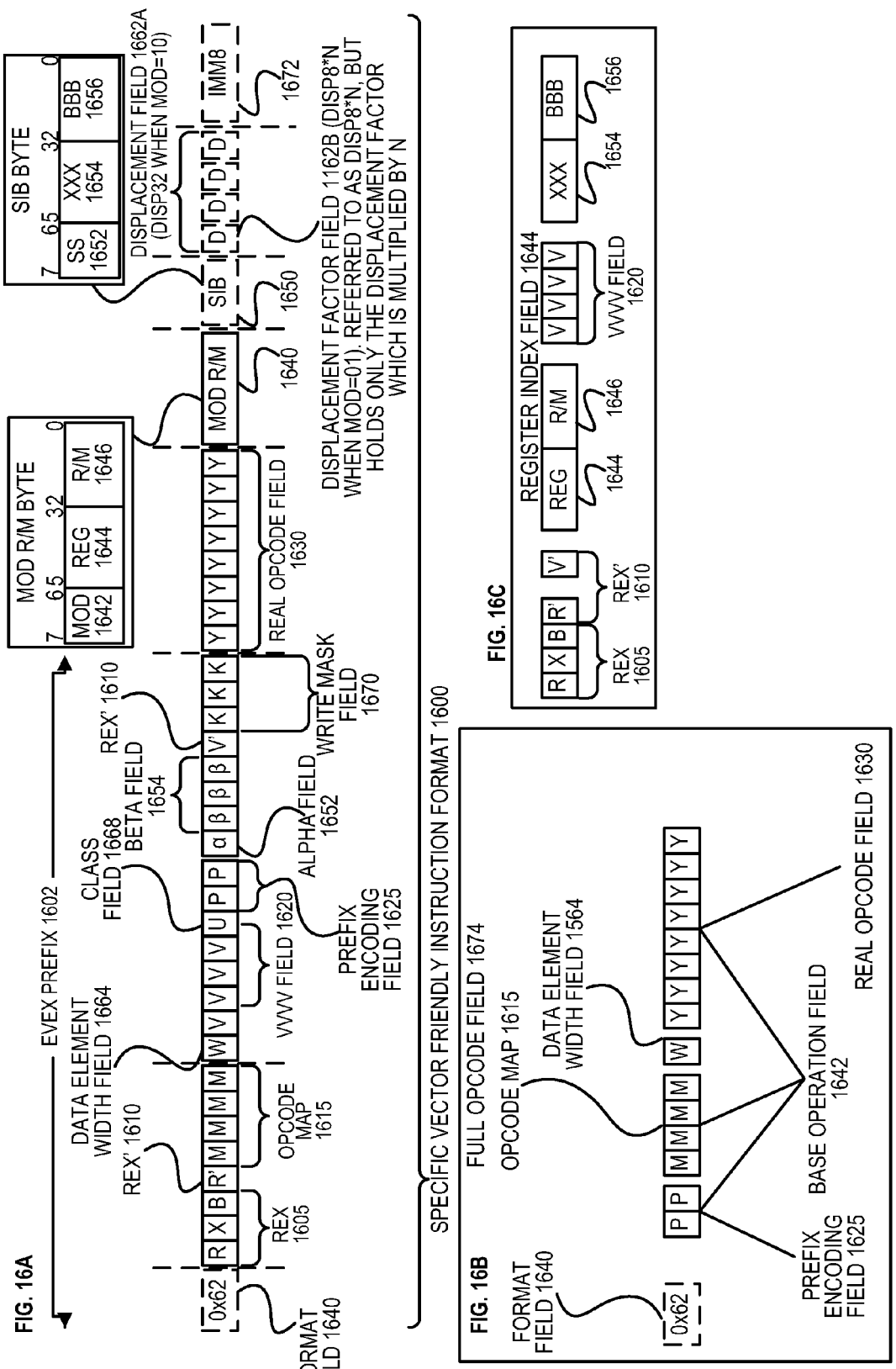

HETEROGENEOUS PROCESSOR APPARATUS AND METHOD

BACKGROUND

1. Field of the Invention

This invention relates generally to the field of computer processors. More particularly, the invention relates to a heterogeneous processor apparatus and method.

2. Description of the Related Art

Heterogeneous computing architectures provide unique advantages over homogenous architectures because more than one type of compute element is available to perform computation tasks. Different compute elements (also referred to as "processing elements" or "functional units") are better suited than others for different tasks. For example, compute element A is faster than compute element B when running task X, but compute element A might be slower than compute element B when running task V. Hardware that contains both compute elements A and B is therefore more efficient at running a combination of tasks X and V, than hardware that only contains compute elements of type A or B.

In spite of the well-known advantages of heterogeneous computing architectures, there are few examples of heterogeneous computing for CPU cores in the real world. These architectures require software to know how to schedule tasks appropriately to each CPU core types (in this case the compute elements are CPU cores). As hardware evolves and core types change, it is very difficult for software (e.g., operating systems) to keep track of the different types of CPU cores which are available and how to harness heterogeneity effectively. For this reason, there is no core heterogeneity support in mainstream operating systems such as Windows™ and Linux, and there is unlikely to be widespread support for this functionality in the near future.

BRIEF DESCRIPTION OF THE DRAWINGS

A better understanding of the present invention can be obtained from the following detailed description in conjunction with the following drawings, in which:

FIG. 13d illustrates core allocations for different types of threads.

FIGS. 15a-b are block diagrams illustrating a generic vector friendly instruction format and instruction templates thereof according to embodiments of the invention;

FIG. 16a-d illustrate a block diagrams of an exemplary specific vector friendly instruction format according to embodiments of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
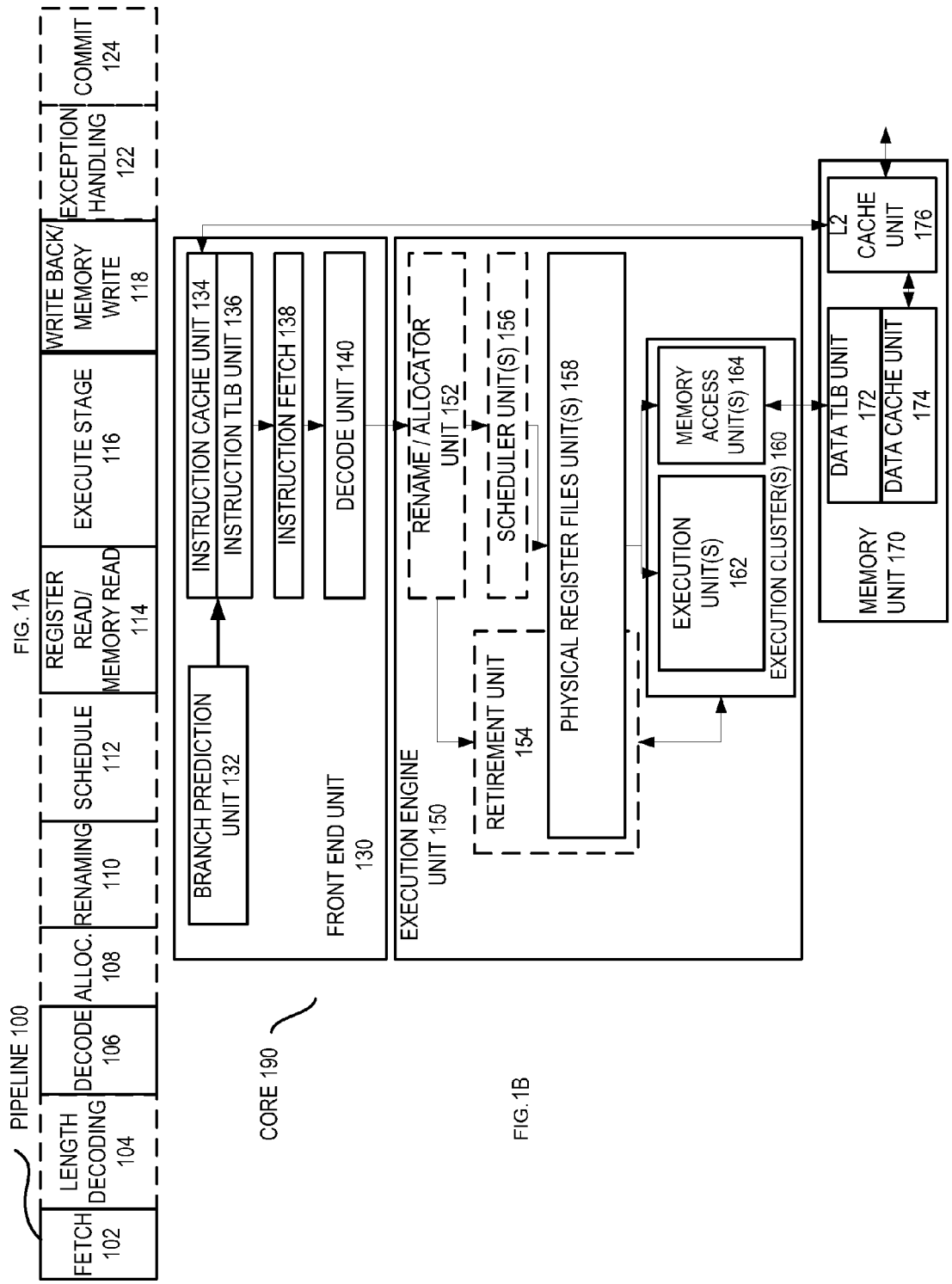
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, microcode entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
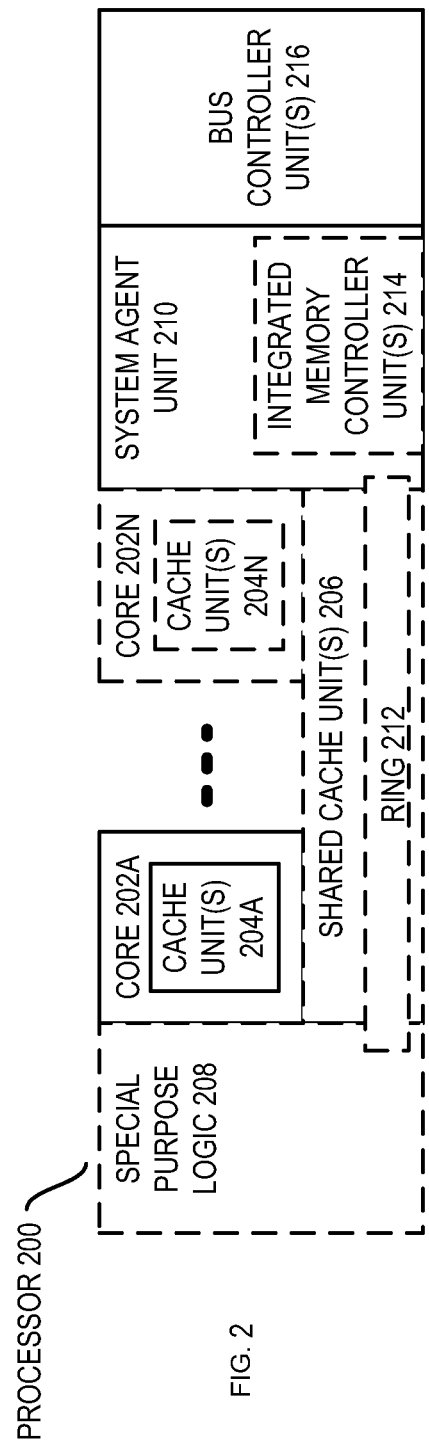
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the special purpose logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the special purpose logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
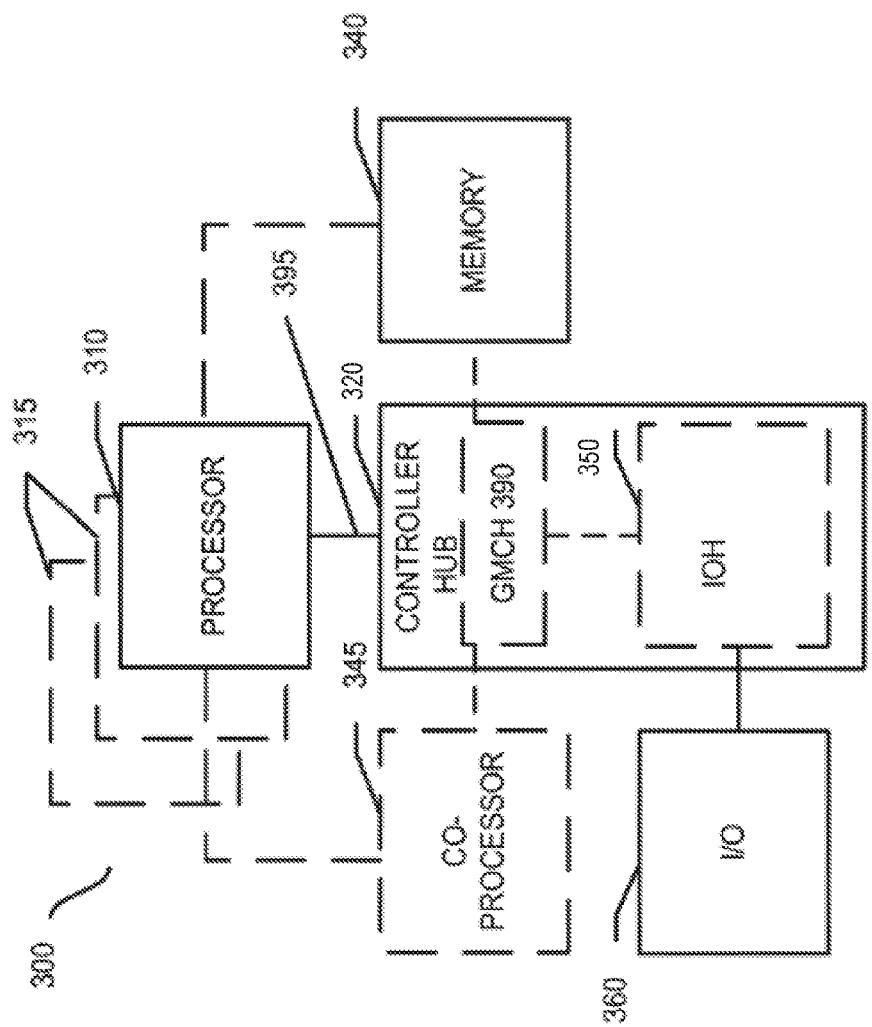
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. Each of the processors 310, 315 may include a plurality or virtual cores as described below with respect to FIGS. 8-14. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
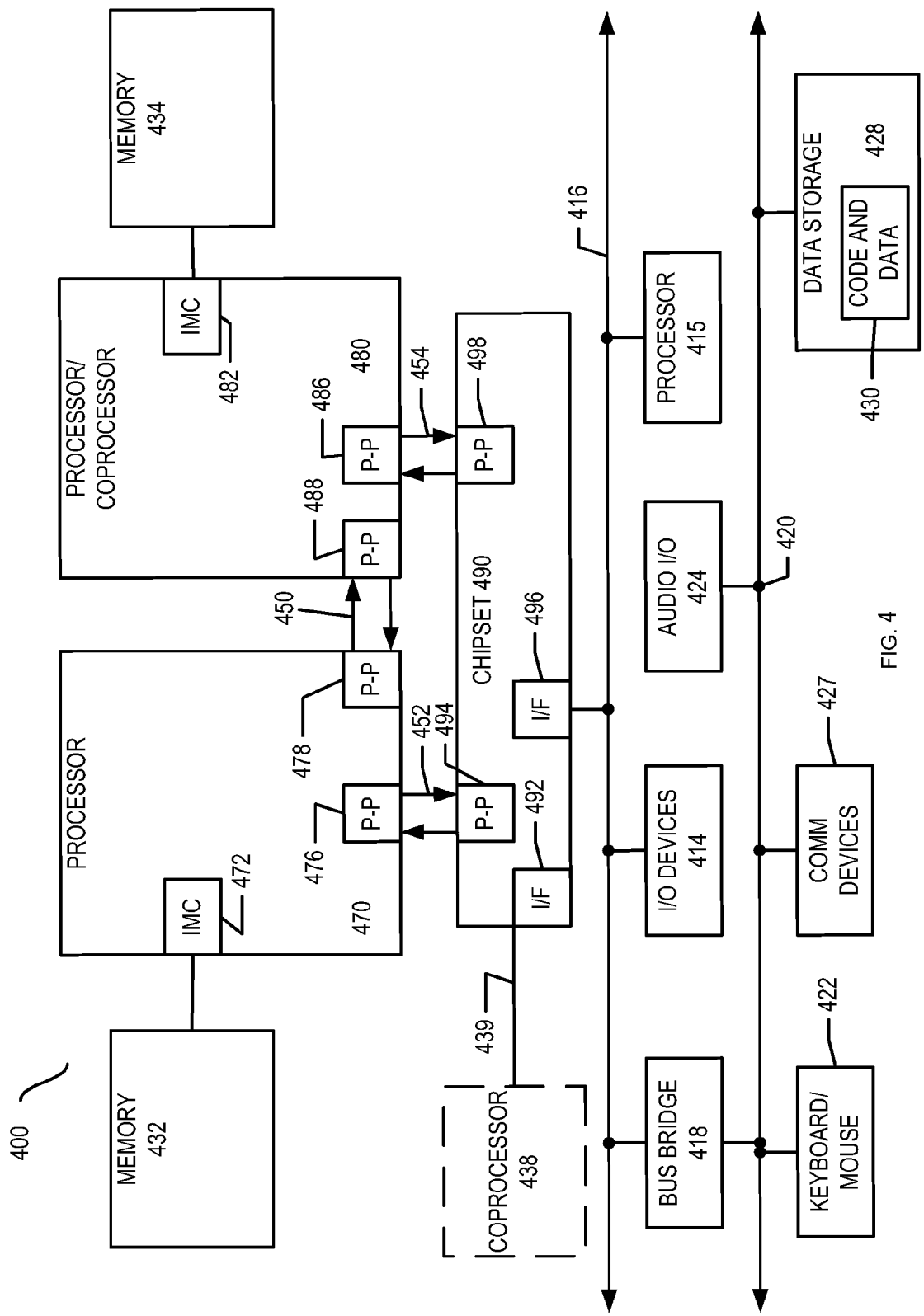
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416.

In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
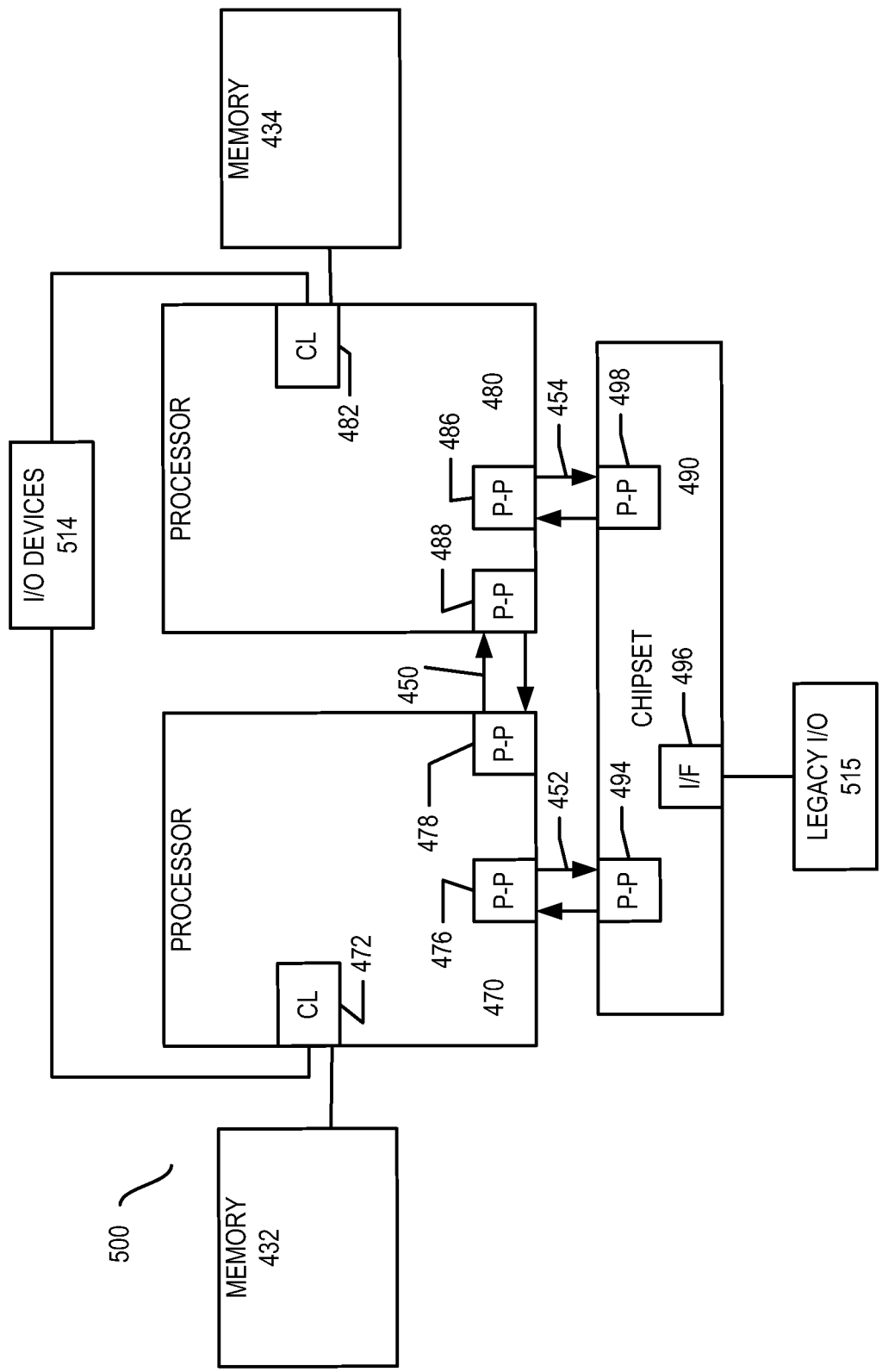
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
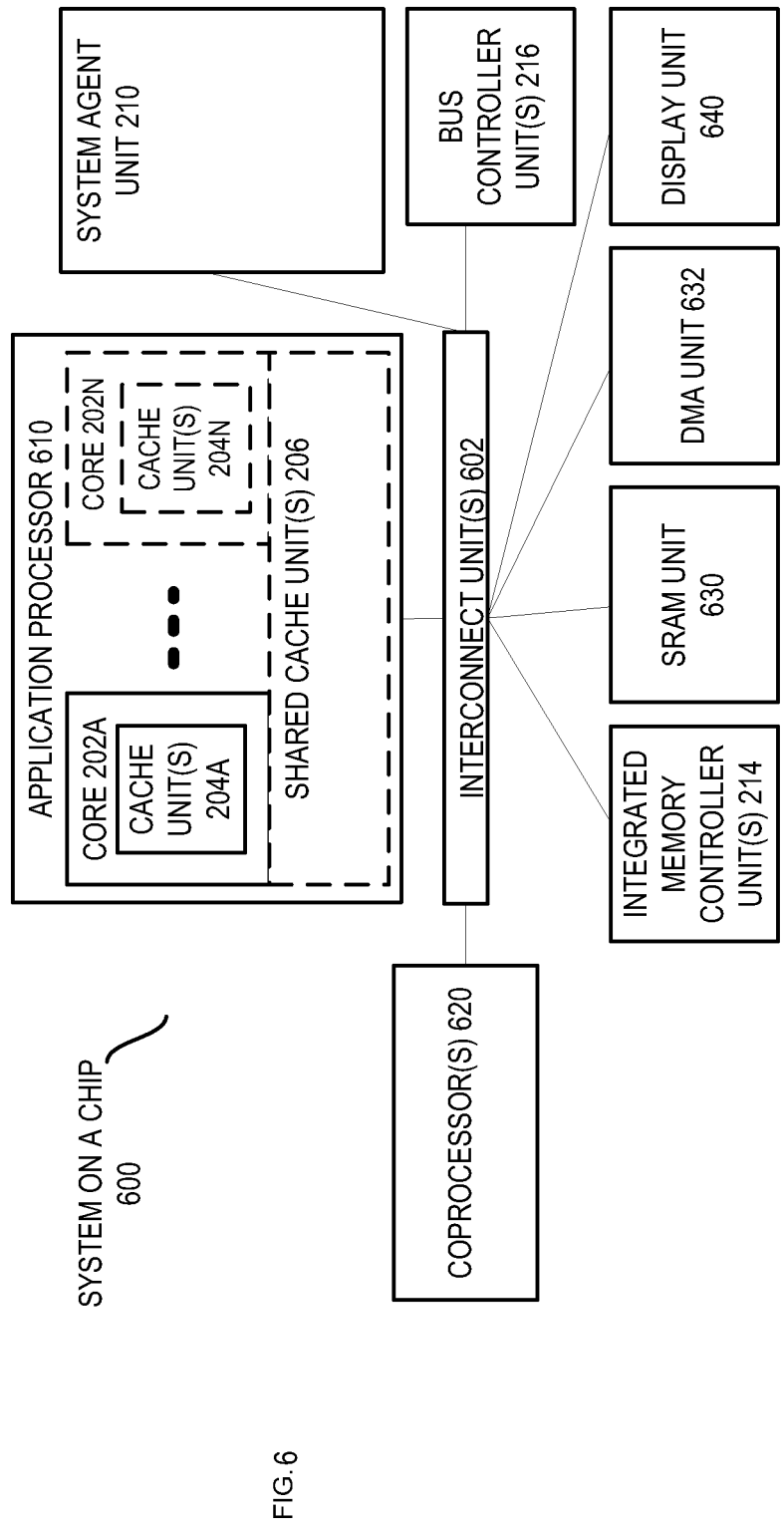
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
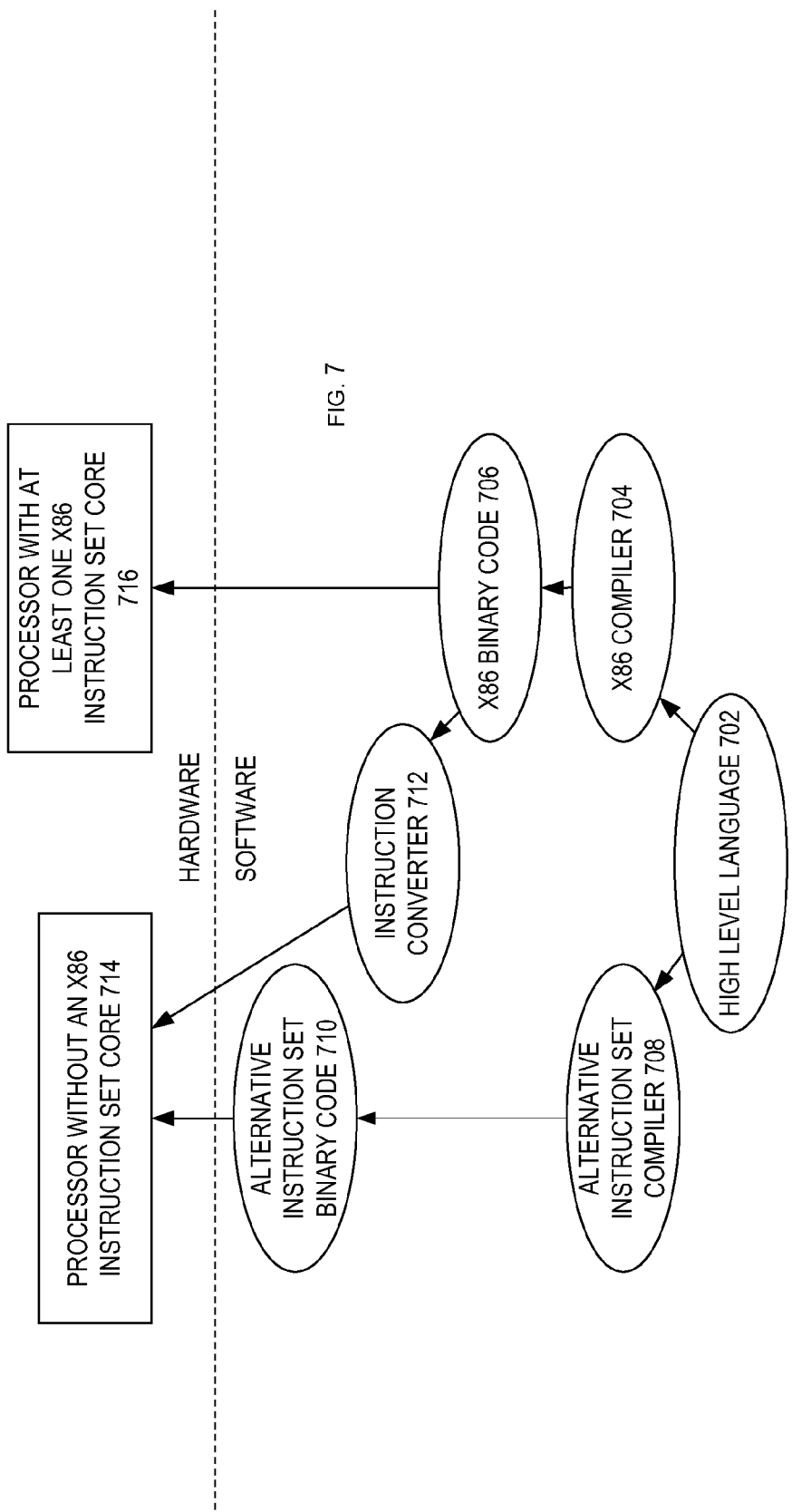
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Software-Transparent Heterogeneous Computing

The embodiments of the invention described below overcome the lack of software support for heterogeneity by hiding it from software and integrating all heterogeneity-aware logic and heuristics within the processor. Whereas, in a conventional CPU, the assignment of tasks to cores is done exclusively by software (typically by the operating system), in one embodiment of the invention this assignment is broken down into two parts. Software continues to schedule software processes to the homogeneous "virtual cores" exposed by the processor, while hardware dynamically selects which physical core implements a given virtual core. Software scheduling algorithms intended to maximize throughput, performance, or other metric continue to work, while hardware performs another (transparent) layer of optimization, where the processes/threads running on each virtual core are directed to whichever physical core is best suited for the type of workload running on that virtual core.

One embodiment of the invention includes a hardware architecture containing different types of compute elements, each type exhibiting different performance and power characteristics. In some of the embodiments described herein, the compute elements are cores within a multi-core processor. However, different forms of compute elements may be employed while still complying with the underlying principles of the invention (e.g., functional units or accelerators within a single processor core).

By exposing a number of virtual and homogeneous compute elements to the software, the heterogeneous nature of the hardware is hidden from the software (e.g. operating system, applications, etc). The software therefore operates as if it were running on a processor with homogeneous cores. The processor hardware of this embodiment includes logic to dynamically map each of the virtual compute elements exposed to the software to one or more of the physical compute element types available. The specific mechanism by which the hardware dynamically chooses the physical compute elements is transparent to (hidden from) the software.

By including a heterogeneous selection of compute elements, the processor hardware can always operate very efficiently in very different operating conditions with very different types of computational tasks. For example, a CPU that contains both a small, power-efficient core and a big, high-performance core can be used to run software efficiently at times when power is limited (and performance is not critical) and also at other times when high performance is needed (but power is not limited). The selection of different combinations of compute elements within the hardware is based on the design requirements of which types of tasks need to run on the system and under which conditions.

Heterogeneous systems may contain different types of compute elements, such as processor cores, graphics processor units (CPUs), and fixed function accelerators (e.g., for accelerating common functions such as sorts and loops). In the embodiments of the invention set forth below, the heterogeneous systems have different types of processor cores—i.e., a few high-performance cores and a larger number of small power-efficient cores. However, the underlying principles of the invention may be employed with other types of compute elements.

Figure 8:
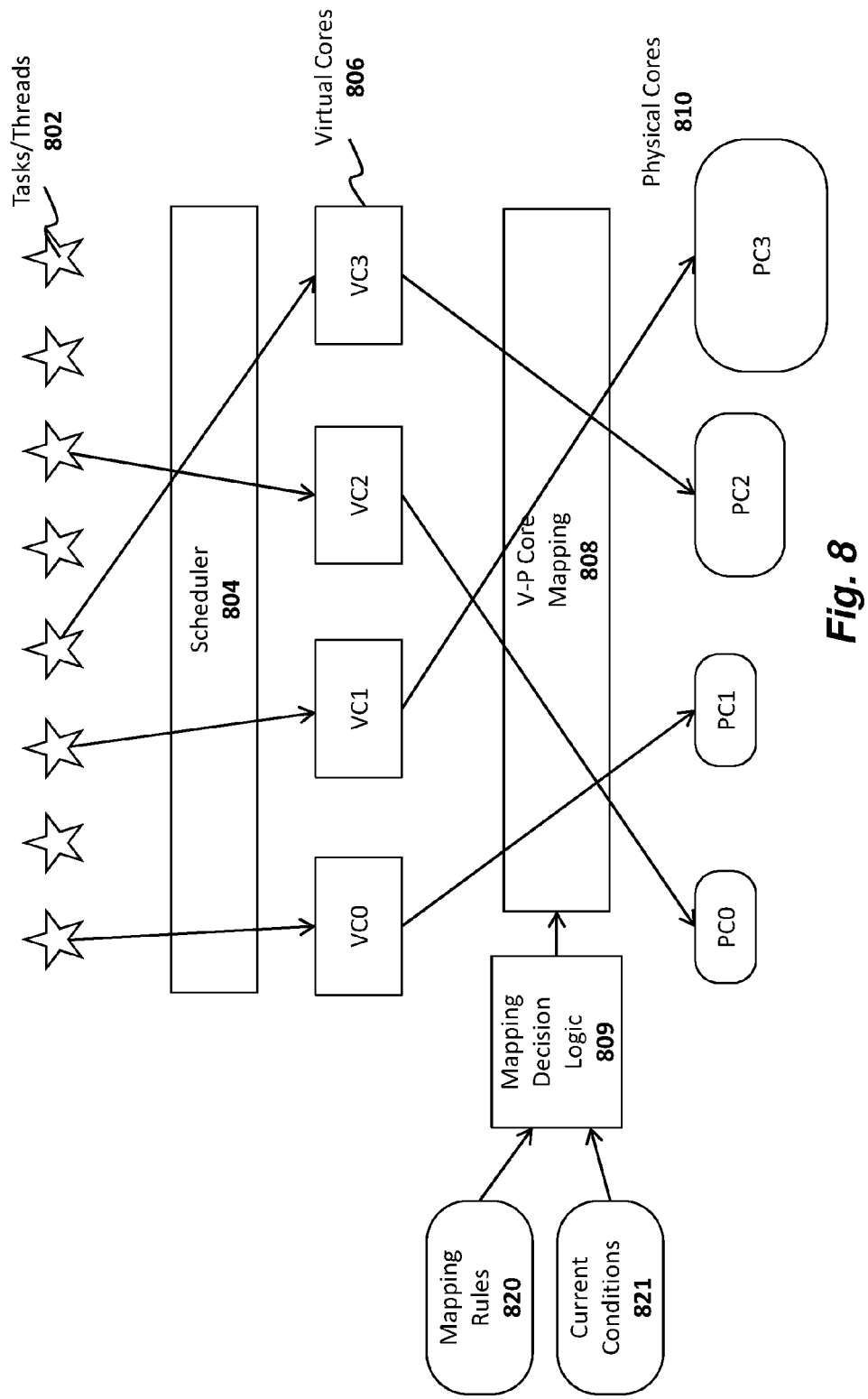
FIG. 8 illustrates one embodiment of a heterogeneous processor architecture.

FIG. 8 illustrates one embodiment of a heterogeneous core system which provides software transparency. The processor hardware contains a number of heterogeneous physical cores, PC0-PC3 810. However, only homogeneous virtual cores VC0-VC3 806 are exposed to software. Consequently, a software-based scheduler 804 (which may be part of an operating system) schedules tasks 802 to execute on each of the exposed homogeneous virtual cores 806 just as it would in a true homogeneous multi-core processor or multi-processor system. While the scheduler 804 continues to schedule software tasks to the virtual cores 806, virtual-to-physical (V-P) mapping logic 808 maps each virtual core 806 to one or more appropriate physical cores 810. In one embodiment, the mapping decisions are performed by mapping decision logic 809 in response to a set of mapping rules 820 and current detected conditions 821. The mapping rules 820 and mapping decision logic 809 may be implemented in firmware, software, hardware, or any combination thereof. If implemented in hardware, the mapping rules 820 and mapping decision logic 809 may be integrated as logic on the processor chip within the V-P core mapping logic 808. If specified in software or firmware, the mapping rules 820 and mapping decision logic 809 may be programmed and reprogrammed after the chip is fabricated and sold. The underlying principles of the invention remain the same regardless of how the mapping rules 820 and mapping decision logic 809 are implemented.

Several specific examples of mapping rules and conditions used by the mapping decision logic 809 are provided below (e.g., implemented based on the requirements of the tasks being executed and the power profile of the processor). Briefly, in one embodiment, the mapping decision logic 809 implements a mapping algorithm to determine how the various virtual cores 806 should be mapped to physical cores 810 in accordance with the mapping rules 820 and current operating conditions 821. In one embodiment, the mapping decision logic 809 configures a hardware mapping table to be used by the V-P core mapping logic 808 to perform the physical mapping between the virtual and physical cores.

In the specific example shown in FIG. 8, virtual core VC0 is mapped to physical core PC1, virtual core VC1 is mapped to physical core PC3, virtual core VC2 is mapped to physical core PC0, and virtual core VC3 is mapped to physical core PC2. The different sizes of the physical cores 810 in FIG. 8 are used to connote the amount of processing power of each core. Thus, physical core PC3 is a "big," high-performance core; physical cores PC0-PC1 are "small," power-efficient cores; and physical core PC2 provides higher performance relative to the small cores PC0-PC1 but lower performance relative to the big core PC3.

Thus, in FIG. 8, the V-P core mapping logic 808 (implementing the mapping rules 820 and based on the current conditions 821) has determined that the tasks allocated to virtual cores VC0 and VC2 are best suited for a small core, that the task allocated to VC1 is one best suited to a big, high powered core, and the task associated to VC3 is somewhere in between. This implementation allows the system to realize the benefits of heterogeneity without requiring software to know anything about it.

As mentioned above, the mapping decision logic 809 may perform mapping in view of currently detected operating conditions 821 associated with the computing system. For example, if the computing system is a mobile device, then the V-P core mapping logic 808 may perform mapping differently depending on whether the mobile device is currently powered by a battery or plugged into an electrical outlet (e.g., tending to use the smaller cores when possible while powered by the battery). Similarly, if the battery level of the mobile computing system is low (e.g., below some specified threshold), then the V-P core mapping logic 808 may refrain from using the big, high-performance core PC3 (which would tend to drain the battery more quickly) unless absolutely necessary. As another example, if a significant amount of power of the overall power budget of the system is being consumed by another processor component (e.g., the graphics processing unit is performing graphics-intensive operations), then the V-P core mapping logic 808 may refrain from using the big, high-performance core PC3. In such a case, the current conditions 821 may indicate the amount of the overall power budget currently available for the cores 810 (e.g., the total minus that amount being consumed by other system components) and the V-P core mapping logic 808 may perform mapping accordingly.

Although three different cores are illustrated in FIG. 8, one embodiment of the invention comprises N small cores and M big cores, where N>M. A software-transparent heterogeneous system with big and small cores can be tuned for a number of different scenarios. By dynamically changing the heuristics implemented in the V-P core mapping logic 808, the system can be optimized for different settings. Three exemplary embodiments are: (1) optimize for performance, (2) optimize power budgeting, and (3) optimize for energy efficiency. For example, if the computing device is plugged in to an AC outlet and/or has a full battery, then the V-P core mapping logic 808 system may opt for (1), mapping to the big, high-powered core PC3 more often. By contrast, when not on AC power and/or when battery is low, the V-P core mapping logic 808 may choose (3), using only the small physical cores PC0 and PC1. When a power budget is specified, the V-P core mapping logic 808 will choose the highest performance option possible while maintaining the system within the specified power budget (e.g., utilizing the high-performance core PC3 only if such usage fits within the power budget).

As mentioned above, the heuristic implemented by the V-P core mapping logic 808 that maps the virtual to physical cores can also coordinate performance and power levels with other CPU components like the graphics processor (GPU).

The heuristic may be implemented in hardware, but even if it is implemented in firmware or software, it can co-ordinate much better with hardware than the operating system could because the heuristic is provided by the processor vendor. For example, the heuristic can look at GPU power utilization in real time (as indicated by current operating conditions 821), and decide in real time how much remaining power can be used by the physical cores 810. The heuristic then maps virtual cores 806 to physical cores 810 based on these specified power constraints.

Figure 9B:
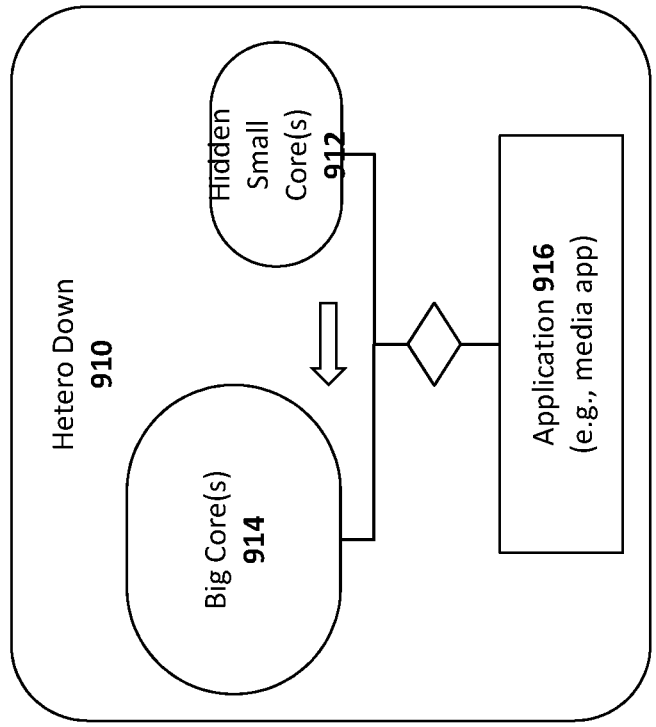
FIGS. 9A and 9B illustrate embodiments which include hidden big cores and hidden small cores, respectively.
Figure 9A:
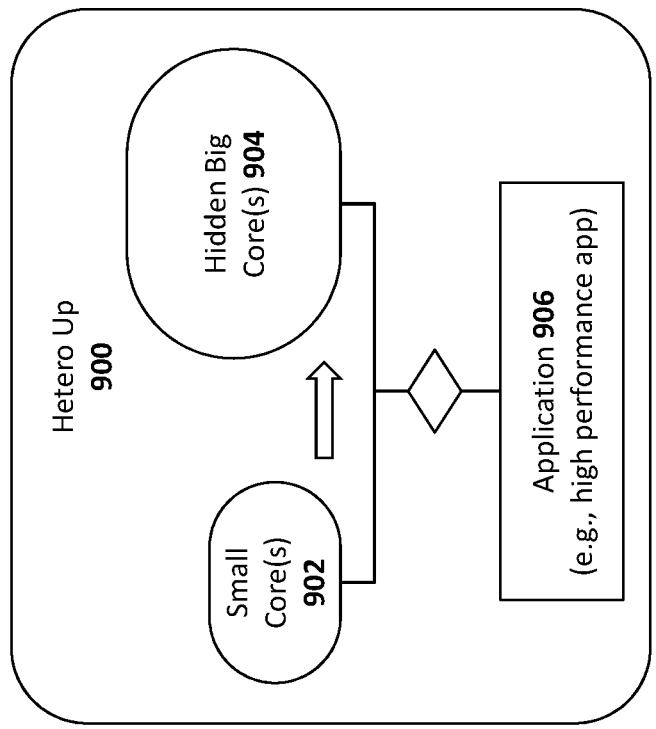

As illustrated in FIG. 9a, one embodiment of a heterogeneous core computing implementation, referred to herein as "Hetero-UP" 900, consists of exposing only small power-efficient cores 902 to software. When additional performance is needed by an application 906 (and power budget is available), the V-P core mapping logic 808 transparently uses a high-performance big physical core 904 to run in place of the small core.

As illustrated in FIG. 9b, another embodiment of a heterogeneous core computing implementation, referred to herein as "Hetero-Down" 910, consists of exposing only big, high-performance cores 914 to software. When power savings are needed (and performance is not critical for the application 916), the V-P core mapping logic 808 transparently uses a power-efficient small physical core 912 to run in place of the big core 914.

There are at least two distinct advantages to the transparent approach described above:

(1) The operating system or application software does not need to know that the CPU has heterogeneous cores (or other compute elements). This means that legacy software, including operating systems, will continue to work with the described hardware. Similarly, future operating systems and software applications will not need to be constantly updated to reflect the type of heterogeneity on every version of hardware.

(2) All of the heuristics implemented by the mapping decision logic 809 or V-P core mapping logic 808 to leverage heterogeneity benefits are contained within the hardware or by the software or firmware bundled with the hardware (i.e., provided by the processor vendor). Consequently, future hardware designs may create more aggressive and innovative compute element choices since the full extent of the changes are hidden from software and do not require software updates.

Figure 10:
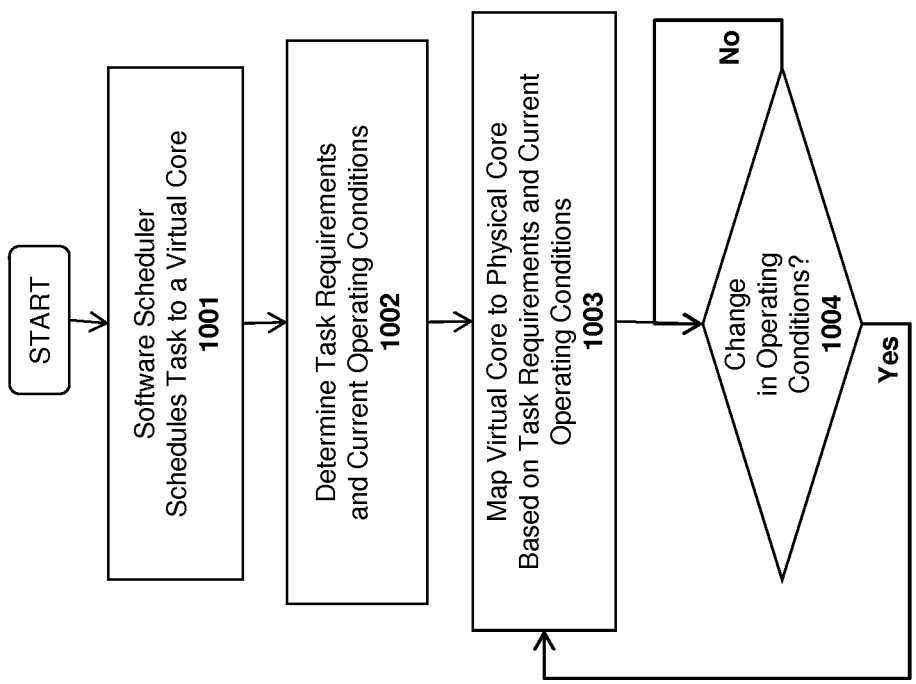
FIG. 10 illustrates one embodiment of a method for mapping virtual cores to physical cores.

A method in accordance with one embodiment of the invention is illustrated in FIG. 10. At 1001, a software-based scheduler schedules a task to a virtual core. As mentioned, in one embodiment, the processor hardware exposes a set or virtual cores for use by the software. At 1002, the hardware determines the requirements of the task to be executed and the current operating conditions of the computing system. For example, some high-performance application may require or execute more efficiently on a high-performance core while other applications (e.g., media applications) may not require the processing power of the high-performance core.

Based on the current operating conditions and/or task requirements (determined at 1002), at 1003, the virtual core to which the task is assigned is mapped to a physical core in the processor. For example, if the task is one which requires high-performance processing, then it may be mapped to a high performance core. As mentioned above, in some implementations, all or a subset of the physical cores may be "hidden" such that the mapping is performed transparently to the software.

In one embodiment, the processor continually monitors the current operating conditions and re-maps virtual cores to physical cores in response to detected changes. Thus, at 1004, if a change in operating conditions is detected, then the process loops back to 1003 where a re-mapping of virtual cores to physical cores may be performed. By way of example, the change in conditions may be the battery power in a mobile device reaching a threshold value or the mobile device being moved from AC power to battery power. The underlying principles of the invention may be adapted to detect and re-map virtual to physical cores in response to a variety of other changes in operating conditions.

Improving Serial Performance Using Heterogeneous Systems

When selecting the compute elements to be used for a system, there is generally a tradeoff between performance and efficiency. For example larger, complex cores (such as the "big" cores described above) can achieve higher performance but are very wasteful in using energy. On the other hand, smaller optimized cores (such as the "small" cores described above) can be very energy efficient (minimize energy per instruction), but their maximum performance is limited. Similar tradeoffs exist for other system components including, for example, data interconnects, graphics, and memory.

On workloads that are highly parallelized, the best design approach is to use a large number of small, energy-efficient compute elements (e.g. small cores). These elements provide the ability to compute a fixed number of instructions with the least amount of energy. Since the workload is parallel, additional performance can be achieved by increasing the number of compute elements (e.g. small cores) while maintaining the same level of energy efficiency (energy per instruction stays low). However, if the workload (or part of it) is not parallelized, then it can run in at most one core. In such a case, performance cannot be increased by using more cores; the only way to increase performance is to use a more powerful (bigger) core at the cost of energy efficiency.

Since workloads are not completely predictable and contain different mixes of code (parallel and serial), it is not possible to design a single type of compute element that is optimal at all times. A better design choice is to use a heterogeneous combination of cores that address different workload and system requirements at different times. In one embodiment of the invention, when the workload is parallelized, small energy-efficient cores are used. When the workload is not parallelized and performance is needed, then a large, complex core is used.

One embodiment of the invention consists of a hardware-based processor architecture containing a large number of small cores that are energy efficient and are exposed to software. That is, they are made visible to the software such that a software-based scheduler can schedule tasks/threads for execution on the cores. In addition, the processor architecture includes a small number of big cores that provide high performance and are hidden from software (i.e., the software-based scheduler cannot directly schedule tasks/threads on the big cores).

The large number of exposed small cores allow the software to run parallel code in an efficient manner. For example, the operating system scheduler will detect the number of small cores and parallel applications will then be able to generate multiple software threads for parallel execution on the small cores. The parallel threads may be scheduled across all or a subset of the small cores. When there are a sufficient number of active software threads, the application runs very efficiently (high performance and low energy per instruction) since all small cores are used.

However, if there are phases of the application when parallelism is limited (e.g., the number of active threads is lower than the number of available small cores), then the application performance on small cores will also be limited since some of the small cores will be waiting idly, not doing any work. To compensate for this loss in small-core performance, one embodiment of the invention transparently swaps some of the active small cores with big cores. Because the big cores are higher performance, executing one or more of the threads on the big cores will improve the overall performance of the application. During these non-parallel or "serial" phases of the application, there will be fewer cores active, but, because some big cores are used, the cores as a whole may use more power and have higher performance.

Figure 11A:
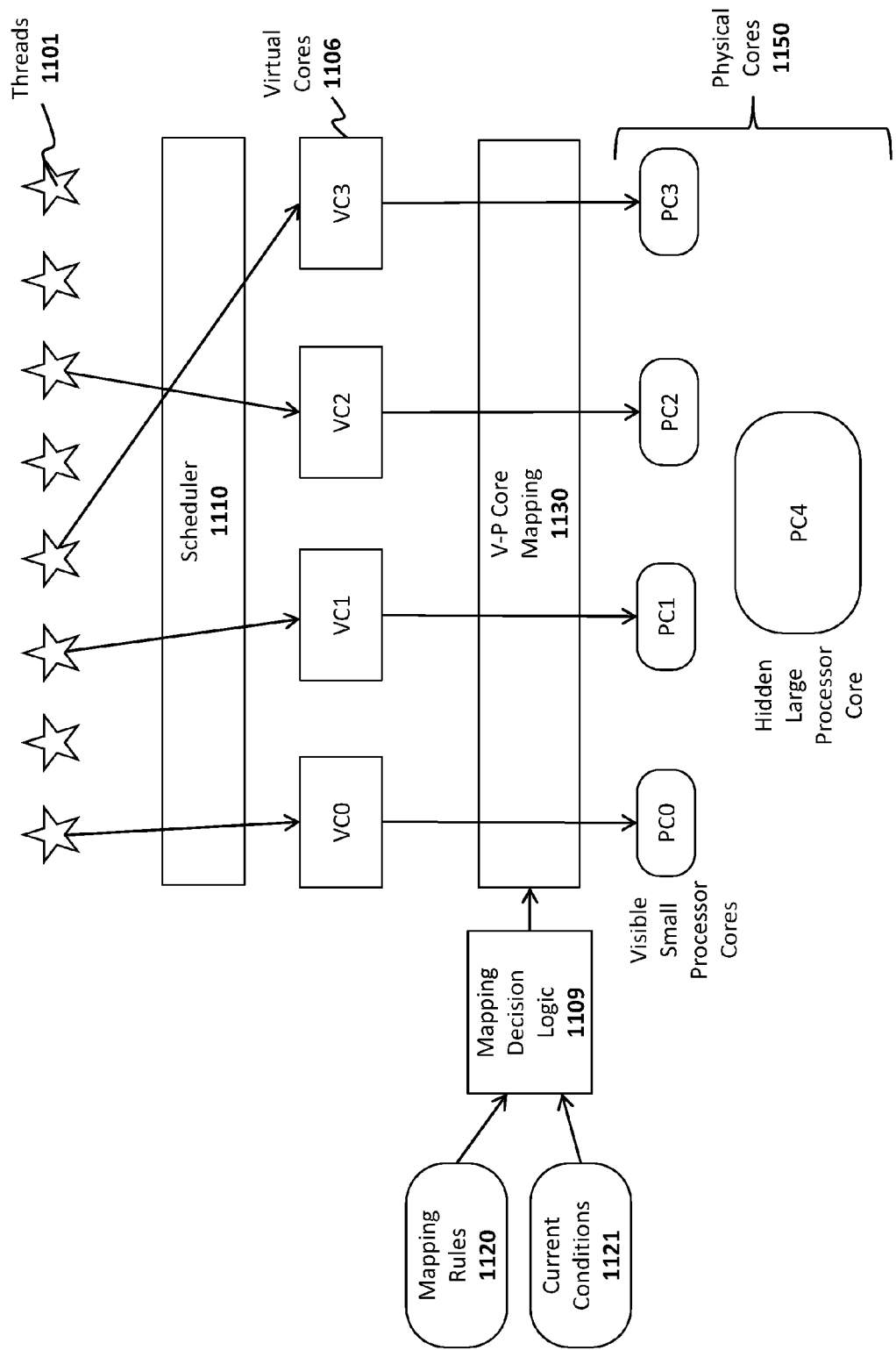
FIGS. 11a-b illustrate one embodiment of a system with a hidden large core and multiple visible small cores.
Figure 11B:
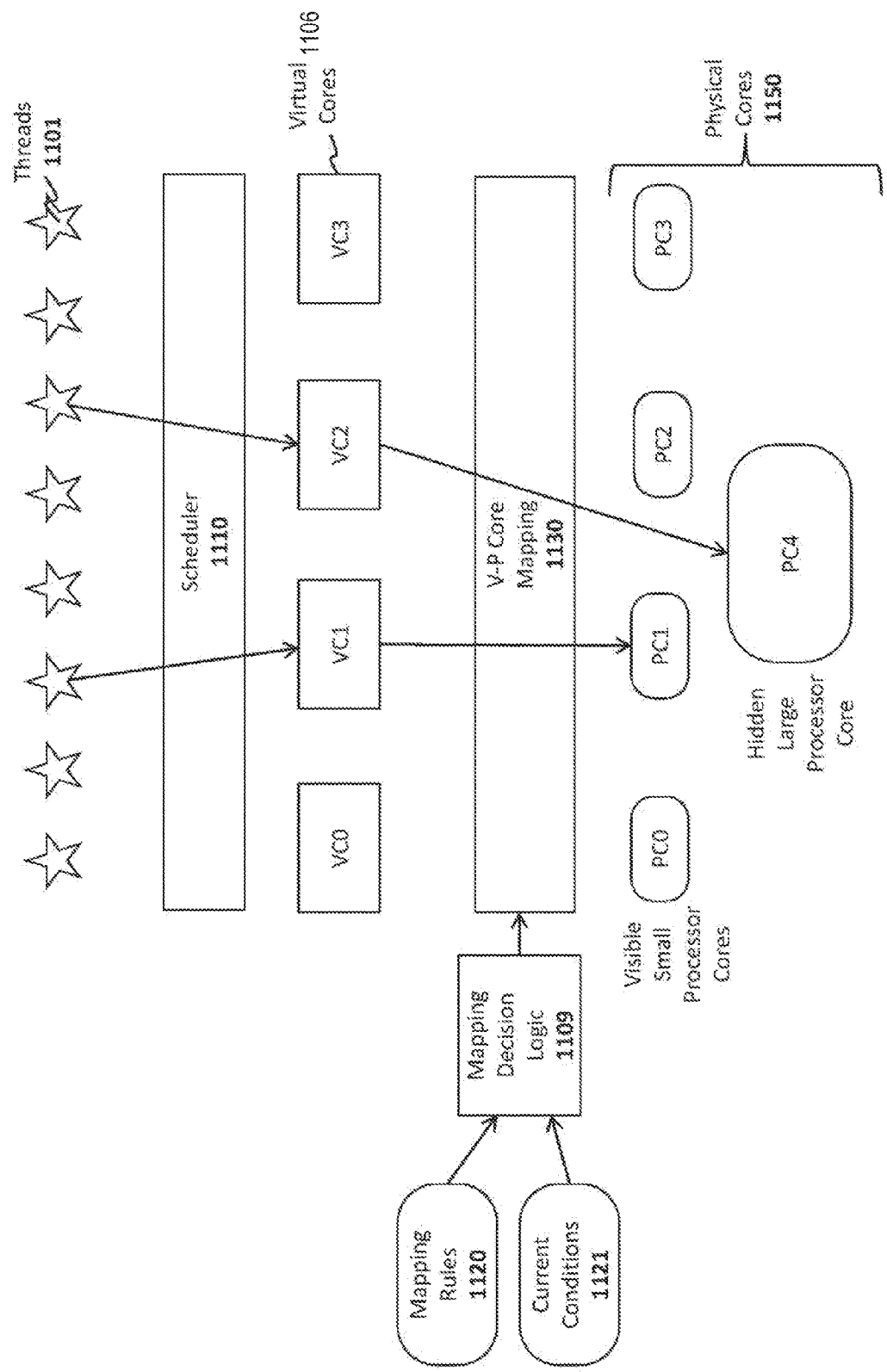

FIGS. 11*a-b* illustrate how one embodiment of the invention transparently swaps a small core with a big core when needed. Unless otherwise stated, the components in FIGS. 11*a-b* perform the same functions as the corresponding components described above with respect to FIG. 8. The processor hardware contains a number of heterogeneous physical cores, PC0-PC4 1150 which include a set of small cores PC0-PC3 and one large core PC4. In this embodiment, homogeneous virtual cores VC0-VC3 1106 are directly exposed to software. Consequently, a software-based scheduler 1110 (which may be part of an operating system) schedules threads 1101 for execution on each of the exposed homogeneous virtual cores 1106 just as it would in a true homogeneous multi-core processor or multi-processor system. Virtual-to-physical (V-P) mapping logic 1130 maps each virtual core 1106 to one or more appropriate physical cores 1150 according to a set of mapping rules 1120 and based on currently detected conditions 1121. As described above, the mapping decisions may be performed by mapping decision logic 1109 which may be implemented in software, hardware, firmware, or any combination thereof.

As illustrated in FIG. 11*a*, there is a default 1:1 mapping between the virtual cores 1106 and the small cores PC0-PC3. Consequently, in this implementation, the small cores PC0-PC3 are effectively made visible to the software-based scheduler. In one embodiment, when the system has a low utilization (below a specified threshold) and/or when most small cores are busy (e.g., with a high processing load above a specified threshold), this default mapping is maintained. For example, in one embodiment, when the system has a low utilization (e.g., no core exceeds 60% activity) or when most small cores are busy (e.g., more than 75% of the total available cores are more than 60% active), this default mapping is maintained.

However, in one embodiment, when the system has a large number of idle cores (e.g., more than 50% of all available cores) and a few (one or more) heavily loaded, very active cores, then the heuristic implemented by the mapping decision logic 1109 automatically changes the mapping as illustrated in FIG. 11 *b*. Here, only two threads 1101 are being scheduled by the scheduler 1110 to virtual cores VC1 and VC2, and at least one of the virtual cores (VC2 in the example) has activity above a specified threshold. Consequently, in this example, the V-P core mapping logic 1130 has remapped the virtual core VC2 from the small physical core PC2 to the big physical core PC4 in response to the mapping decision rendered buy the mapping decision logic 1109.

Figure 12:
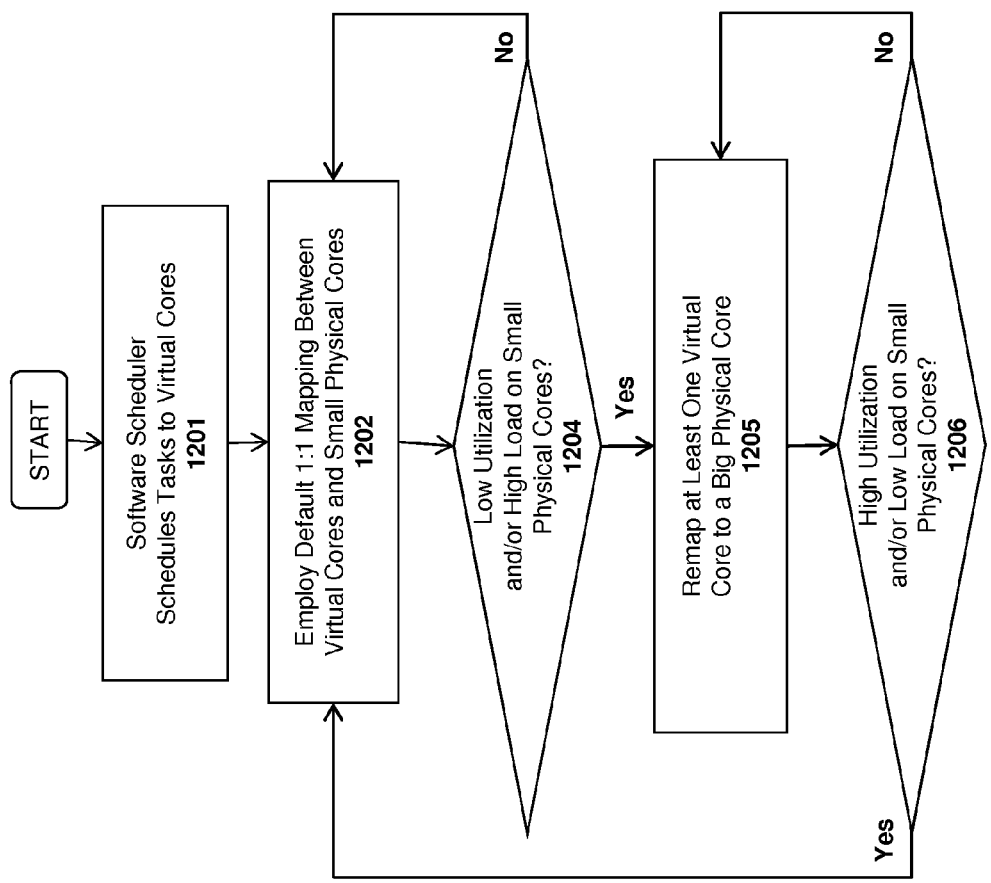
FIG. 12 illustrates one embodiment of a method for mapping virtual cores to physical cores.

A method in accordance with one embodiment of the invention is set forth in FIG. 12. At 1201, the software-based scheduler schedules tasks/threads to virtual cores as previously described. As mentioned, in one embodiment, a default 1:1 mapping is employed between virtual cores and small cores, thereby exposing the small cores to the software. Thus, at 1202, the default mapping is initially used to process the tasks/threads. If the number of active small cores is below a threshold (e.g., 50% of all cores) and/or a load on at least one of the small cores above a threshold is detected (determined at 1204), then at 1205, at least one of the virtual cores is mapped to the big physical core (e.g., the virtual core with the highest load). In one embodiment, the V-P core mapping logic continues to monitor utilization and load on each of the cores. At 1206, if a the number of active cores is above a threshold (e.g., 75% of all cores) and/or load on the small cores below a threshold is detected (indicating a parallel portion of the application being executed), then at 1202, the V-P core mapping logic returns to the default mapping in which each virtual core is mapped to a small physical core.

Improving Energy Efficiency Using Heterogeneous Systems

As new computing devices become ubiquitous and personalized, the nature and usage of typical workloads is changing dramatically. Netbooks, tablets, smart phones, and other client devices are powered on for long periods of time, but perform most of their heavy computing work in short bursts. At the same time, as computing devices become more portable, battery life and energy efficiency is an increasingly important concern. A heterogeneous chip multiprocessor consisting of cores with varying power and performance profile provides an opportunity to boost perceivable performance, while being energy efficient.

A system consisting of all high-performance cores would be able to deliver a superior level of single-threaded performance which would guarantee a rich end-user experience. However, such a multiprocessor would consume a significant amount of power to feed the power-hungry cores. One embodiment of the invention described herein includes a heterogeneous processor comprising M high-performance (big) cores, and N energy efficient (small) cores, and an integrated graphics engine. Small cores are used to provide power savings during long periods of continuous operation, while the big cores are used to rapidly boost single-threaded performance during short and bursts periods of activity.

As illustrated in FIG. 13*d*, one typical example of a client use case is Web page browsing 1392 while listening to music 1391. A browser application is idling most of the time; it becomes active only after receiving a request from the end user to start loading a web page or render new content. When the browser application becomes active, there is a sudden peak in its performance requirement. On the other hand, a media player application is active continuously but with low CPU activity throughout as the compressed music stream is decoded. A heterogeneous system can exploit the diversity in this type of a workload to improve noticeable performance by using a big core during the short period of Web-page rendering, while using a small core to run media player over long periods of time.

The embodiments of the invention described below employ a software-transparent approach for realizing such a heterogeneous system by exposing only the big cores to the software and hiding the small cores. Consequently, this avoids the undesirable situation of a software-aware heterogeneous system which would require the software to have full knowledge of the heterogeneous resources to determine the best-suited resource for a given workload at a particular point of time. By leveraging the small cores for sustained operation, significant power can be saved which can be either re-directed to boost graphics performance (either to transform a game from unplayable to playable or to improve the quality of the game) which directly translates to improvement in end-user perceived performance or to increase battery life of the device. Furthermore, if the number of small cores (N) is greater than the number of big cores (M), the small cores may provide higher multi-threaded performance than the big cores. In a transparent implementation of such a heterogeneous system, this is likely to occur when the big cores are hyper-threaded and the small cores are not.

Figure 13A:
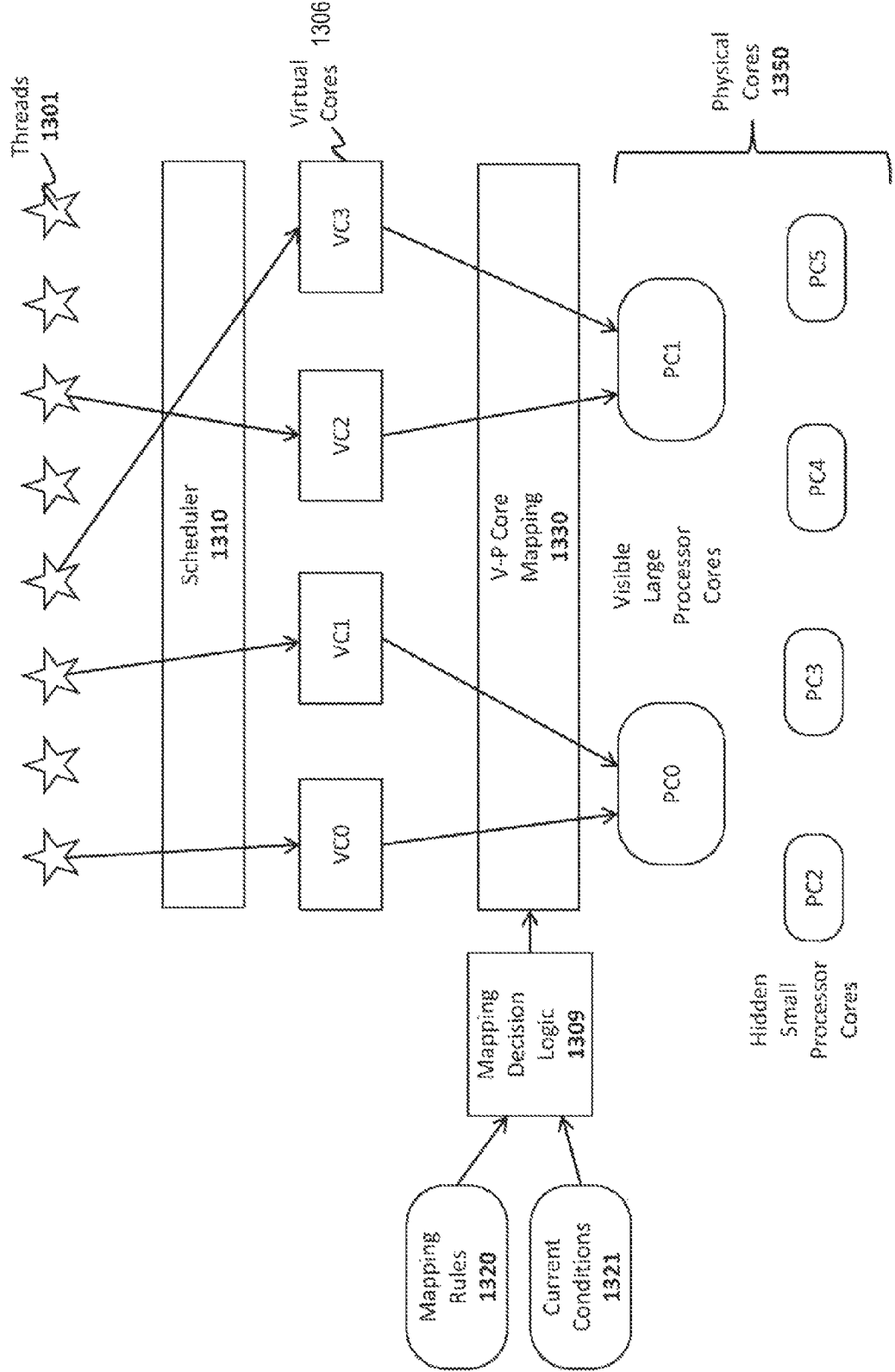
FIGS. 13a-c illustrate one embodiment of a system with hidden small cores and multiple visible large cores.
Figure 13B:
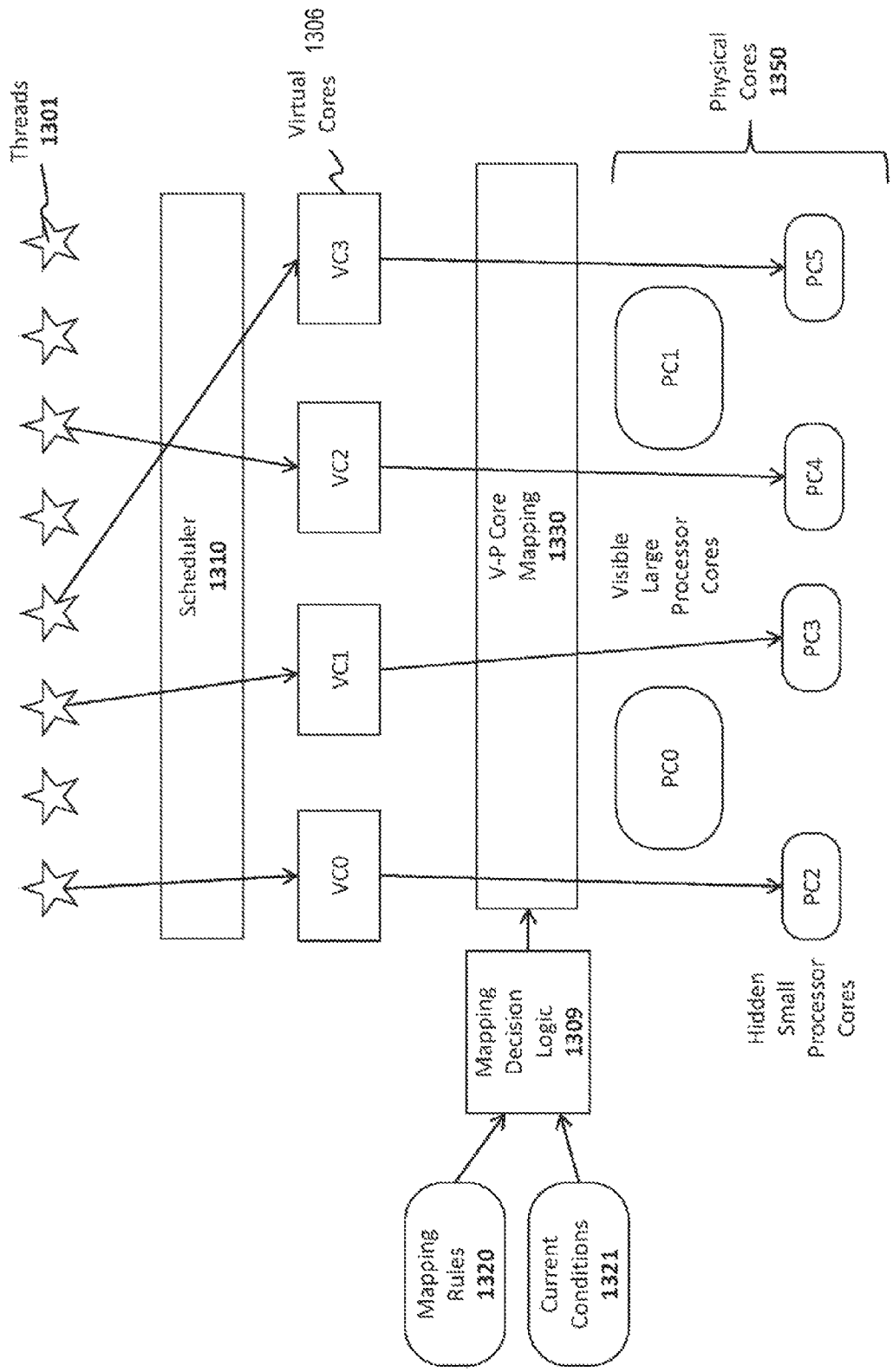
Figure 13C:
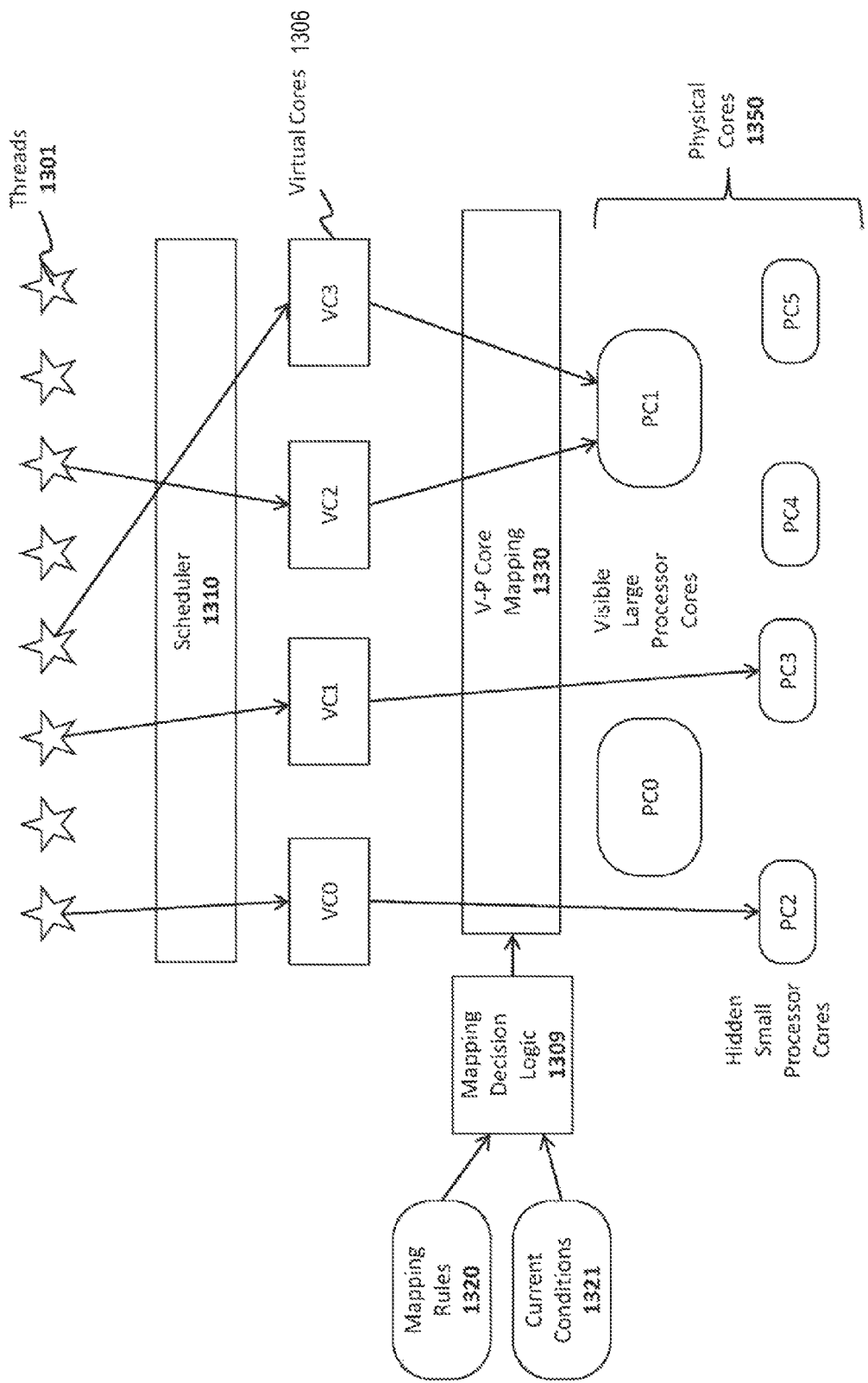

FIGS. 13*a-b* illustrate how one embodiment of the invention in which the processor hardware contains a number of heterogeneous physical cores, PC0-PC5 1350 which include a set of small cores PC2-PC5 and two large cores PC0-PC1. In this embodiment, homogeneous virtual cores VC0-VC3 1306 are directly exposed to software. Consequently, a software-based scheduler 1310 (which may be part of an operating system) schedules threads 1301 for execution on each of the exposed homogeneous virtual cores 1320 just as it would in a true homogeneous multi-core processor or multi-processor system. Virtual-to-physical (V-P) mapping logic 1330 maps each virtual core 1306 to one or more appropriate physical cores 1350 according to a set of mapping rules 1320 and based on currently detected conditions 1321. Unless otherwise stated, the components in FIGS. 13*a-b* perform the same functions as the corresponding components described above with respect to FIGS. 8 and 11*a-b*. For example, as described above, the mapping decisions may be performed by mapping decision logic 1309 which may be implemented in software, hardware, firmware, or any combination thereof.

As illustrated in FIG. 13*a*, in one embodiment, the default mapping used by the V-P core mapping logic 1330 maps two of the virtual cores 1306 to each of the big physical processor cores PC0-PC1. Thus, in this embodiment, each of the physical processor cores PC0-PC1 is capable of simultaneous multithreading (i.e., each physical processor core PC0-PC1 is capable of hyperthreading of at least 2 threads). In one embodiment, under the default mapping, the small processor cores PC2-PC5 are hidden from software while the large processor cores PC0-PC1 are exposed. Thus, in a default configuration the software may "see" two hyperthreaded processor cores PC0-PC1 or the two physical processor cores may appear to software as four or more processor cores due to the hyperthreading capability of the cores (e.g., if the cores are capable of 2-way hyperthreading, then the software may see 4 processor cores, if capable of 3-way hyperthreading, then the software may see 6 processor cores, etc).

As illustrated in FIG. 13*b*, in response to detecting a change in the types of threads being processed and/or other conditions 1341 associated with the computing system, the mapping decision logic 1309 causes the V-P core mapping logic 1330 to remap the threads from the exposed big cores PC0-PC1 to the hidden small cores PC2-PC5. In yet another embodiment, illustrated in FIG. 13*c*, only two of the threads are remapped from big core PC0 to small cores PC2 and PC3; the other two threads remain mapped to big core PC1. It should be noted that these examples are provided merely for the purposes of explanation. The underlying principles of the invention are not limited to any particular mapping of threads to cores or to any particular number of big/small cores.

One embodiment of the invention leverages the small cores PC2-PC5 to provide power savings during long periods of continuous operation (such as that which results from media playback 1391 in FIG. 13*d*), while big cores PC0-PC1 are used to rapidly boost single-threaded performance during short and potentially bursty periods of activity (such as results from Web page browsing 1392 or other interactive applications) in a manner which is transparent to the software.

In one embodiment, the heuristic implemented by the V-P core mapping logic 1330 evaluates a variety of factors to converge to a migration decision to migrate between big and small cores, including:

(1) The number of active physical cores. This information may be used to identify multi-threaded workloads.
(2) Current utilization on each of the active physical cores. This information may indicate, for example, the level of processing power needed to execute a particular thread.
(3) Current utilization on the graphics engine. This information is relevant when there are power and/or thermal budgets which need to be met.
(4) Projection for future graphics performance requirement. This information is also relevant to anticipate the power which will be consumed by the graphics subsystem in the future (and therefore the amount of power budget available to the physical cores).

In the specific example illustrated in FIG. 13*b*, the mapping decision logic 1309 has determined that the workload currently running on the system is highly multithreaded and, consequently, has re-mapped the threads from the big cores PC0-PC1 to the small cores PC2-PC5. The mapping decision logic 1309 may evaluate one or more of the above factors to trigger the migration to all small cores. For example, the mapping decision logic 1309 may evaluate the fact that while both big cores being used in FIG. 13*a*, the processing resources of these cores may not be heavily utilized (as would be the case, for example, if one of the cores is processing an audio stream or other type of thread which does not require the processing performance of a big core). It may also detect, for example, that the current or anticipated utilization of the graphics engine is high and reallocate to the smaller cores to conserve energy (i.e., to maintain power consumption within the constraints of a power or thermal budget).

The following specific examples demonstrate how a heterogeneous system can be used to boost perceivable performance, while being energy efficient. It should be noted, however, that the underlying principles of the invention are not limited to these specific use cases:

Multi-Tasking Scenario: This use case consists of a mix of compute-light core workload and bursty compute-heavy core workload. One example is the combination of Web-page browsing 1392 while listening to music 1391 illustrated in FIG. 13*d*.

Since music playback exhibits low demand for CPU resources, it can be run on a small core without sacrificing noticeable performance while still saving a significant amount of power compared to running on the big core. On the other hand, a browser application is idling most of the time; it becomes active only after receiving a request from the end user to start loading a web page or render new content. When the browser application becomes active, there is a sudden peak in its performance requirement. To guarantee a superior end-user experience, the V-P core mapping logic 1330 will leverage the big cores when the user initiates a Web-page load to minimize the page load times.

Graphics-Intensive Scenario: Typical gaming workloads such as those resulting from 3D games exhibit significantly lower compute demand for the CPU than the GPU. Under power-constrained operation (e.g., where a power budget is set at a threshold), small efficient cores can help improve the end-user perceived performance by significantly improving the quality of a playable game. For example, a particular 3D graphics-intensive game may require the graphics engine to run at a frequency X to deliver 30 frames per second. When running the game using a big core, the graphics engine cannot be allotted frequency X because of the power budget. Instead, it would have to run at a lower frequency Y, resulting in lower quality graphics and/or frame rate. By contrast, if the small cores are leveraged to run the game, the graphics frequency can be boosted from Y to X by allocating the core power savings to the graphics engine.

Multi-Threaded Scenario: If the number of small cores is greater than the number of big cores (N>M), the small cores would provide higher multi-threaded performance than the big cores. In a transparent implementation of such a heterogeneous system, this is likely to occur when the big cores are hyper-threaded and the small cores are not.

Apparatus and Method for Intelligently Powering Heterogeneous Components

One embodiment of the invention comprises a system on a chip (SoC) architecture in which all the components of the SoC are power-controlled at the same time at sufficiently fine granularity, and at their maximum performance level for an ideal consumer experience. In this embodiment, power budgeting and/or thermal budgeting algorithms are used to power those components which are the most critical to the user experience at the current moment in time. In one embodiment, each component operates in a separately-controllable power "plane." The frequency and voltage provided to a power plane may be independently controllable to adjust power in response to control signals provided by a power control unit (PCU). By controlling each component of the SoC individually, each component is made to operate at a different operating point in the power-performance curve.

Different power management algorithms may be implemented by the power controller depending on the usage scenario intended for the SoC. For example, as discussed in detail below, a SoC used in a desktop or laptop computer may require a different power management algorithm to provide an acceptable user experience than that used for the same SoC in a set-top box, a tablet computer, or a smartphone.

In one embodiment, the algorithms are run out-of-band, in a microcontroller unit that has control registers to dynamically adjust the various power planes. In another embodiment, the algorithms are run in-band on the main application processor within the context of the operating system to exercise the power plane controls. In this embodiment, the power control algorithms may be made visible to the operating system and configurable via a graphical user interface. In addition, each of the components may have intelligence to determine that they currently need more power/performance and request the needed power/performance from the out-of-band or the in-band controller. In this embodiment, the algorithm may work by judging the user-experience requirements.

Figure 14A:
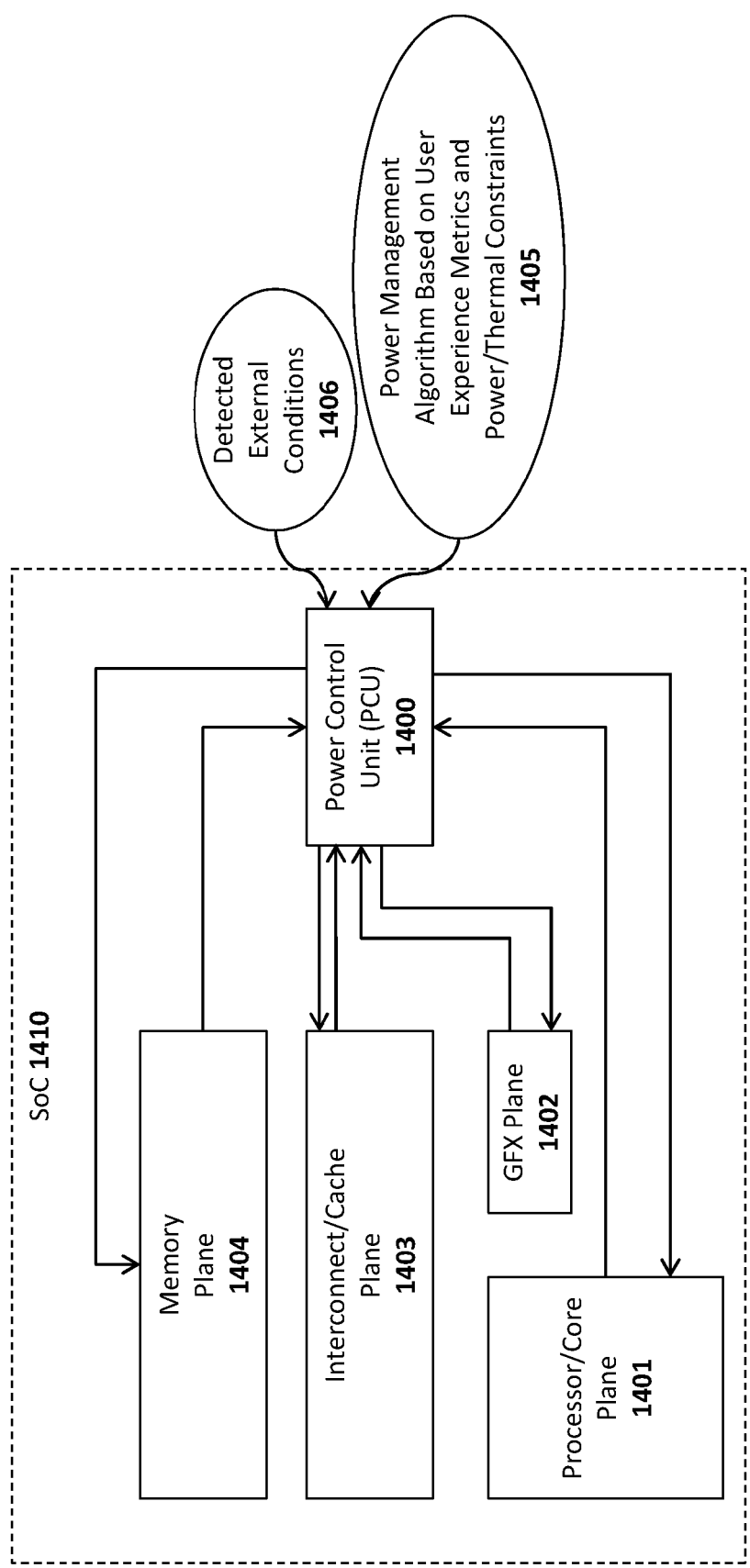
FIGS. 14a-b illustrate embodiments of the invention for intelligently allocating power to heterogeneous processor components.

FIG. 14a illustrates a power control unit (PCU) 1400 within a SoC 1410 in accordance with one embodiment of the invention which controls the power/performance of several exemplary power planes including a memory plane 1404 associated with a main memory (e.g., a random access memory); an interconnect/cache plane 1403 associated with a chip interconnect and/or cache memory; a graphics (GFX) plane 1402 associated with a graphics processing unit (GPU); and a processor/core plane 1401 associated with the main processor or core within the SoC. While this specific implementation is used for the purposes of illustration, the underlying principles of the invention are not limited to any particular arrangement of power planes. In alternate implementations, each core within a processor and/or each of the individual functional units within each core may be implemented on a separate power plane.

Each power plane 1401-1404 may be configured with logic and circuitry to dynamically adjust operating voltage and frequency in response to control signals generated by the PCU 1400 (while executing the current power management algorithm). For example, each power plane 1401-1404 may have a separately controllable voltage regulator module (VRM) and phase locked loops (PLLs) in order to adjust voltage and frequency, respectively. In one embodiment, voltage and frequency are adjusted together using a predetermined set of voltage/frequency combinations in response to the control signals from the PCU 1400. Alternatively, or in addition to voltage/frequency scaling, the power planes 1401-1404 may adjust power consumption using other techniques such as instruction issue throttling, duty cycling, power and clock gating, and issue-width reduction.

In one embodiment, the PCU 1400 is loaded with a particular power management algorithm 1405 based on the user experience metrics for the device in which the SoC 1410 is used. Thus, the user experience metrics (and therefore the power management algorithm 1405) will be different for different types of devices. By way of example, and not limitation, if the SoC 1410 is used in a video game console, the PCU may generally allocate more power to the graphics plane 1402 when the user is executing a video game (and reduce power consumption by the other planes to maintain within a specified power threshold). If the SoC 1410 is used in a general purpose computer system, then the PCU 1400 may allocate more power to the processor/core plane 1401 when the user is performing general purpose processing tasks (e.g., browsing the Internet, performing word processing, etc) but may allocate more power to the graphics plane 1402 if the user is performing a graphics-intensive tasks. If the SoC is used in a set-top box such as a cable or satellite box, then the PCU 1400 may allocate more power to a communication interface plane (not shown) and a video decoder (not shown) when the user is watching a cable/satellite channel. Thus, the same SoC may be programmed with different power management algorithms based on user experience metrics 1405 depending on the type of device in which the SoC 1410 is used to maximize the user experience while reducing overall power consumption.

In one embodiment, PCU 1400 reallocates power consumption by each of the power planes 1401-1404 as described above in view of a specified power budget, which may be different for different devices in which the SoC 1410 is used. For example, a mobile device such as a tablet or smartphone (which typically runs on a battery) may have a relatively lower power budget than a set-top box or a desktop computer-dvgjkmkj system (which typically runs on AC power).

The following example illustrates one embodiment of the above concepts. It will be assumed for the purposes of this example that the device in which the SoC is used has an overall power budget of 2 W. It takes about 1.5 W to run the processor/core plane 1401 at a guaranteed clock speed, 1.5 W for graphics 1402 and 1.75 W for the interconnect/cache plane 1403. Given these numbers, it is not possible for two or more of the system components to operate at full power at the same time. Consequently, the PCU 1400 of this embodiment must intelligently reallocate power to each of the power planes 1401-1404 based on the power constraints and the workload characteristics of the tasks running on the SoC.

To accomplish these goals, one embodiment of the invention comprises a continuous power management loop that runs in the PCU 1400 that manages power distribution across all the components of the SoC based on the current workload requirements and power constraints. The PCU 1400 continuously tracks the thermal conditions, power dissipation characteristics of the various active components, and the workload characteristics of the current tasks that are running on the SoC. For example, when the software tries to offload a certain portion of the workload to the graphics processor (e.g., to enable a better user experience), the PCU 1400 will switch the processor/core power plane 1401 to a very low clock speed and quickly ramp up the graphics plane 1402 to an appropriate set of execution units and a target frequency that will fit the energy and power budget targets for the SoC 1410. Thus, at this moment in time, a majority of the power budget may be taken from the processor/core plane 1401 and the other power planes and reallocated to the GFX plane 1402.

As soon as the rendering is completed by the GPU, the interconnect fabric and the display engine must display the rendered data on the screen at a very high rate. As the screen resolutions are increasing beyond HD, this requires a lot of bandwidth. Moreover, the interconnect itself requires a large bandwidth and low latency for a smoother consumer experience. Consequently, the PCU 1400 will periodically ramp the power (e.g., increase the frequency/voltage) to the interconnect within the interconnect plane 1403 to fulfill these requirements. Thus, during these periodic refresh times, the PCU delivers a majority of the power budget to the interconnect/cache plane 1403 while decreasing the power to the other planes.

Thus, in the above example, the PCU 1400 tracks the workload requirements on a compute flow basis and delivers the maximum power to the power plane that is most critical in delivering the best user experience at any given instant in time. The PCU 1400 of one embodiment monitors the workload requirements for a given SoC usage and develops heuristics that predict the behavior of a given workload. As a result, the PCU 1400 allocates power across the components of the SoC to deliver improved performance while still limited by a power budget.

In the embodiment shown in FIG. 14a, there are at least two classes of inputs to the PCU 1400: (1) signals received from each of the power planes 1401-1404 requesting power, and (2) the current power management algorithm selected based on user experience metrics and power/thermal constraints.

In one embodiment, the power planes 1401-1404 may request power as needed from the PCU 1400 (e.g., to enter into a high performance mode of operation). In this embodiment, the PCU 1400 may implement the current power management algorithm based on user experience metrics in combination with the requests from the power planes 1401-1404 to determine how to allocate power. For example, if servicing current power requests from the planes would breach the current power/thermal budget, then the PCU 1400 will intelligently allocate power to the components for the best user experience (i.e., based on the user experience metrics for the device in which the SoC is being used).

In addition, an optional input to the PCU 1400 may include currently detected external conditions 1406 such as whether the device in which the SoC chip is used is currently being powered by AC power or a battery. If powered by a battery, the detected external conditions 1406 may specify the current level of the battery. In one embodiment, the PCU may employ a different set of power/thermal constraints depending on whether the device is powered from AC power or a battery, and the current level of the battery (e.g., lowering the power budget to a first threshold if running on battery power and lowering to a second threshold if the battery level drops below a specified level).

Figure 14B:
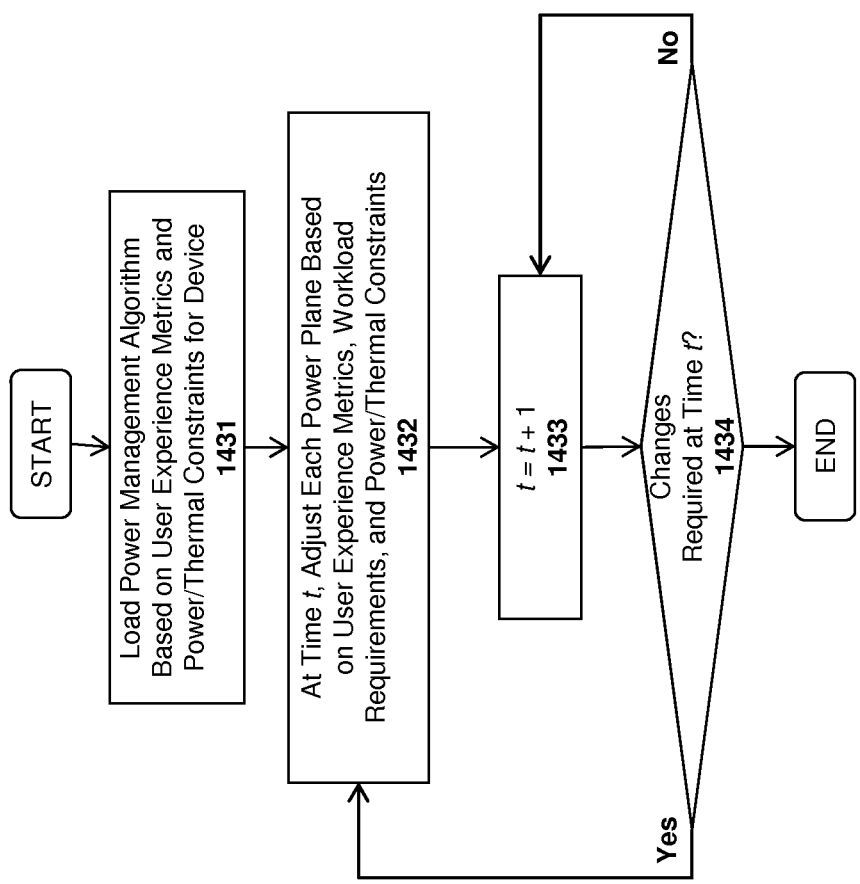

FIG. 14*b* illustrates a method in accordance with one embodiment of the invention. At 1431, a particular power management algorithm is loaded into the PCU based on the user experience metrics associates with the device in which the SoC will be used. In one embodiment, the PCU includes a non-volatile memory such as Flash memory into which the power management algorithm may be loaded and subsequently updated. In this embodiment, the PCU may be reprogrammed after workload requirements of the system in which it is used are monitored and evaluated. In one embodiment, the PCU is an intelligent device which continually monitors and evaluates the workload requirements for the device (based on current user experience metrics) and automatically updates the power management algorithm based on the detected workload. Alternatively, the PCU may be programmed using a read only memory (ROM) device, an application-specific integrated circuit (ASIC), or any other type of circuitry.

Returning to FIG. 14*b*, at 1432, once the PCU has been programmed with the power management algorithm, the PCU adjusts power to each power plane at time t based on the current user experience metrics, the workload requirements for the tasks/processes being executed, and the power/thermal budget (which may itself be based on current conditions such as battery power or AC power). For example, as discussed above, if the device needs to display a sequence of video frames for the user at time t, the PCU 1400 may allocate a significant portion of the power budget to the interconnect/cache plane 1403.

At 1433, the time variable t is increased to indicate a new moment in time. The time variable t may be increased by any convenient step size (e.g., a microsecond, a millisecond, etc). At 1434, a determination is made as to whether changes to the current power allocations are needed at this new moment in time. For example, after the device displays one or more video frames as described above, the GFX plane 1402 may require more power to execute graphics commands to render new video frames. If changes to the power allocations are required, then the process returns to 1432 where the power is reallocated to each power plane based on current requirements. If not, then the previous power allocation remains in place and the process loops back to 1433 to increment the time variable t again.

One of the benefits of the techniques described herein is that a single SoC can easily be integrated for use in many different contexts and devices such as phones, tablets and set-top boxes, while still maintaining an acceptable user experience and power/thermal constraints.

While the embodiments of the invention described herein focus on controlling power by adjusting frequency and voltage, various other/additional techniques may be implemented by the power controller to control the power consumed by each power plane such as instruction issue throttling, duty cycling, power and clock gating, and issue-width reduction. Additionally, while some of the embodiments are described above within the context of a system-on-a-chip (SoC), the underlying principles of the invention may be implemented on various different processor architectures such as a processor with multiple cores (e.g., where each core is associated with a different power plane) or a processor or core with multiple functional units (i.e., where each functional unit is in a separate power plane or groups of functional units are arranged into different power planes). For example, the power management techniques may be employed with any of the architectures illustrated in FIGS. 8, 9*a-b*, 11*a-b*, or 13*a-c* (e.g., in which power is intelligently allocated to each of the different physical processors).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 15B:
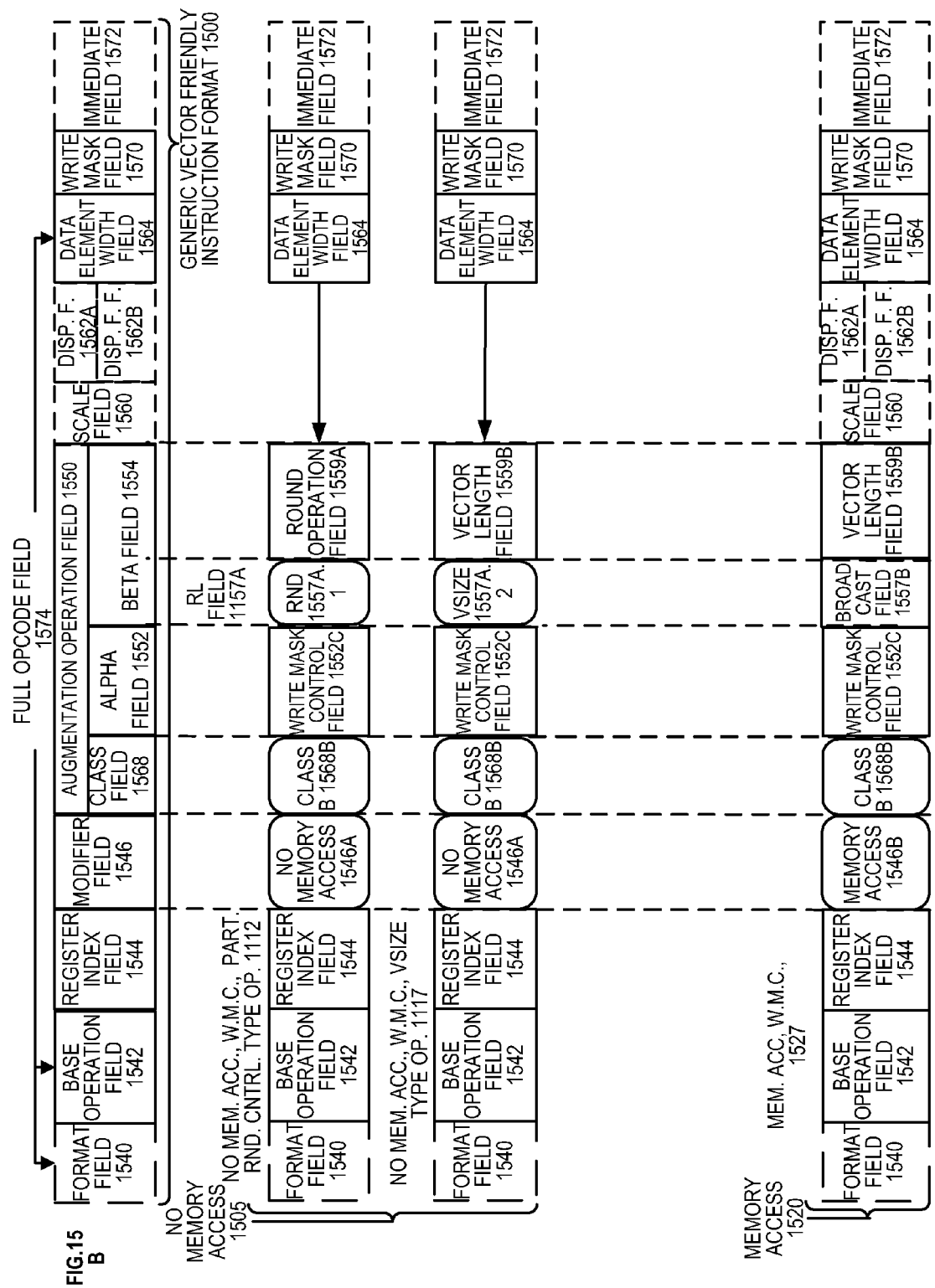

FIGS. 15A-15B are block diagrams illustrating a generic vector friendly instruction format and instruction templates thereof according to embodiments of the invention. FIG. 15A is a block diagram illustrating a generic vector friendly instruction format and class A instruction templates thereof according to embodiments of the invention; while FIG. 15B is a block diagram illustrating the generic vector friendly instruction format and class B instruction templates thereof according to embodiments of the invention. Specifically, a generic vector friendly instruction format 1500 for which are defined class A and class B instruction templates, both of which include no memory access 1505 instruction templates and memory access 1520 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 168 bit (16 byte) data element widths).

The class A instruction templates in FIG. 15A include: 1) within the no memory access 1505 instruction templates there is shown a no memory access, full round control type operation 1510 instruction template and a no memory access, data transform type operation 1515 instruction template; and 2) within the memory access 1520 instruction templates there is shown a memory access, temporal 1525 instruction template and a memory access, non-temporal 1530 instruction template. The class B instruction templates in FIG. 15B include: 1) within the no memory access 1505 instruction templates there is shown a no memory access, write mask control, partial round control type operation 1516 instruction template and a no memory access, write mask control, vsize type operation 1517 instruction template; and 2) within the memory access 1520 instruction templates there is shown a memory access, write mask control 1527 instruction template.

The generic vector friendly instruction format 1500 includes the following fields listed below in the order illustrated in FIGS. 15A-15B.

Format field 1540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1542—its content distinguishes different base operations.

Register index field 1544—its content, directly or through address generation, specifies the locations of the source and destination operands, be they in registers or in memory. These include a sufficient number of bits to select N registers from a P×Q (e.g. 32×516, 16×168, 32×1024, 64×10$^{24}$) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1546—its content distinguishes occurrences of instructions in the generic vector instruction format that specify memory access from those that do not; that is, between no memory access 1505 instruction templates and memory access 1520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1550—its content distinguishes which one of a variety of different operations to be performed in addition to the base operation. This field is context specific. In one embodiment of the invention, this field is divided into a class field 1568, an alpha field 1552, and a beta field 1554. The augmentation operation field 1550 allows common groups of operations to be performed in a single instruction rather than 2, 3, or 4 instructions.

Scale field 1560—its content allows for the scaling of the index field's content for memory address generation (e.g., for address generation that uses $2^{scale}$*index+base).

Displacement Field 1562A—its content is used as part of memory address generation (e.g., for address generation that uses $2^{scale}$*index+base+displacement).

Displacement Factor Field 1562B (note that the juxtaposition of displacement field 1562A directly over displacement factor field 1562B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1574 (described herein) and the data manipulation field 1554C. The displacement field 1562A and the displacement factor field 1562B are optional in the sense that they are not used for the no memory access 1505 instruction templates and/or different embodiments may implement only one or none of the two.

Data element width field 1564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1570 allows for partial vector operations, including loads, stores, arithmetic, logical, etc. While embodiments of the invention are described in which the write mask field's 1570 content selects one of a number of write mask registers that contains the write mask to be used (and thus the write mask field's 1570 content indirectly identifies that masking to be performed), alternative embodiments instead or additional allow the mask write field's 1570 content to directly specify the masking to be performed.

Immediate field 1572—its content allows for the specification of an immediate. This field is optional in the sense that is it not present in an implementation of the generic vector friendly format that does not support immediate and it is not present in instructions that do not use an immediate.

Class field 1568—its content distinguishes between different classes of instructions. With reference to FIGS. 15A-B, the contents of this field select between class A and class B instructions. In FIGS. 15A-B, rounded corner squares are used to indicate a specific value is present in a field (e.g., class A 1568A and class B 1568B for the class field 1568 respectively in FIGS. 15A-B).

Instruction Templates of Class A

In the case of the non-memory access 1505 instruction templates of class A, the alpha field 1552 is interpreted as an RS field 1552A, whose content distinguishes which one of the different augmentation operation types are to be performed (e.g., round 1552A.1 and data transform 1552A.2 are respectively specified for the no memory access, round type operation 1510 and the no memory access, data transform type operation 1515 instruction templates), while the beta field 1554 distinguishes which of the operations of the specified type is to be performed. In the no memory access 1505 instruction templates, the scale field 1560, the displacement field 1562A, and the displacement scale filed 1562B are not present.

No-Memory Access Instruction Templates—Full Round Control Type Operation

In the no memory access full round control type operation 1510 instruction template, the beta field 1554 is interpreted as a round control field 1554A, whose content(s) provide static rounding. While in the described embodiments of the invention the round control field 1554A includes a suppress all floating point exceptions (SAE) field 1556 and a round operation control field 1558, alternative embodiments may support may encode both these concepts into the same field or only have one or the other of these concepts/fields (e.g., may have only the round operation control field 1558).

SAE field 1556—its content distinguishes whether or not to disable the exception event reporting; when the SAE field's 1556 content indicates suppression is enabled, a given instruction does not report any kind of floating-point exception flag and does not raise any floating point exception handler.

Round operation control field 1558—its content distinguishes which one of a group of rounding operations to perform (e.g., Round-up, Round-down, Round-towards-zero and Round-to-nearest). Thus, the round operation control field 1558 allows for the changing of the rounding mode on a per instruction basis. In one embodiment of the invention where a processor includes a control register for specifying rounding modes, the round operation control field's 1550 content overrides that register value.

No Memory Access Instruction Templates: Data Transform Type Operation

In the no memory access data transform type operation 1515 instruction template, the beta field 1554 is interpreted as a data transform field 1554B, whose content distinguishes which one of a number of data transforms is to be performed (e.g., no data transform, swizzle, broadcast).

In the case of a memory access 1520 instruction template of class A, the alpha field 1552 is interpreted as an eviction hint field 1552B, whose content distinguishes which one of the eviction hints is to be used (in FIG. 16A, temporal 1552B.1 and non-temporal 1552B.2 are respectively specified for the memory access, temporal 1525 instruction template and the memory access, non-temporal 1530 instruction template), while the beta field 1554 is interpreted as a data manipulation field 1554C, whose content distinguishes which one of a number of data manipulation operations (also known as primitives) is to be performed (e.g., no manipulation; broadcast; up conversion of a source; and down conversion of a destination). The memory access 1520 instruction templates include the scale field 1560, and optionally the displacement field 1562A or the displacement scale field 1562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1552 is interpreted as a write mask control (Z) field 1552C, whose content distinguishes whether the write masking controlled by the write mask field 1570 should be a merging or a zeroing.

In the case of the non-memory access 1505 instruction templates of class B, part of the beta field 1554 is interpreted as an RL field 1557A, whose content distinguishes which one of the different augmentation operation types are to be performed (e.g., round 1557A.1 and vector length (VSIZE) 1557A.2 are respectively specified for the no memory access, write mask control, partial round control type operation 1516 instruction template and the no memory access, write mask control, VSIZE type operation 1517 instruction template), while the rest of the beta field 1554 distinguishes which of the operations of the specified type is to be performed. In the no memory access 1505 instruction templates, the scale field 1560, the displacement field 1562A, and the displacement scale filed 1562B are not present.

In the no memory access, write mask control, partial round control type operation 1510 instruction template, the rest of the beta field 1554 is interpreted as a round operation field 1559A and exception event reporting is disabled (a given instruction does not report any kind of floating-point exception flag and does not raise any floating point exception handler).

Round operation control field 1559A—just as round operation control field 1558, its content distinguishes which one of a group of rounding operations to perform (e.g., Round-up, Round-down, Round-towards-zero and Round-to-nearest). Thus, the round operation control field 1559A allows for the changing of the rounding mode on a per instruction basis. In one embodiment of the invention where a processor includes a control register for specifying rounding modes, the round operation control field's 1550 content overrides that register value.

In the no memory access, write mask control, VSIZE type operation 1517 instruction template, the rest of the beta field 1554 is interpreted as a vector length field 1559B, whose content distinguishes which one of a number of data vector lengths is to be performed on (e.g., 168, 256, or 516 byte).

In the case of a memory access 1520 instruction template of class B, part of the beta field 1554 is interpreted as a broadcast field 1557B, whose content distinguishes whether or not the broadcast type data manipulation operation is to be performed, while the rest of the beta field 1554 is interpreted the vector length field 1559B. The memory access 1520 instruction templates include the scale field 1560, and optionally the displacement field 1562A or the displacement scale field 1562B.

With regard to the generic vector friendly instruction format 1500, a full opcode field 1574 is shown including the format field 1540, the base operation field 1542, and the data element width field 1564. While one embodiment is shown where the full opcode field 1574 includes all of these fields, the full opcode field 1574 includes less than all of these fields in embodiments that do not support all of them. The full opcode field 1574 provides the operation code (opcode).

The augmentation operation field 1550, the data element width field 1564, and the write mask field 1570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

FIG. 16A-D is a block diagram illustrating an exemplary specific vector friendly instruction format according to embodiments of the invention. FIG. 16A-D shows a specific vector friendly instruction format 1600 that is specific in the sense that it specifies the location, size, interpretation, and order of the fields, as well as values for some of those fields. The specific vector friendly instruction format 1600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 15 into which the fields from FIG. 16 map are illustrated.

It should be understood that, although embodiments of the invention are described with reference to the specific vector friendly instruction format 1600 in the context of the generic vector friendly instruction format 1500 for illustrative purposes, the invention is not limited to the specific vector friendly instruction format 1600 except where claimed. For example, the generic vector friendly instruction format 1500 contemplates a variety of possible sizes for the various fields, while the specific vector friendly instruction format 1600 is shown as having fields of specific sizes. By way of specific example, while the data element width field 1564 is illustrated as a one bit field in the specific vector friendly instruction format 1600, the invention is not so limited (that is, the generic vector friendly instruction format 1500 contemplates other sizes of the data element width field 1564).

The generic vector friendly instruction format 1500 includes the following fields listed below in the order illustrated in FIG. 16A.

EVEX Prefix (Bytes 0-3) 1602—is encoded in a four-byte form.

Format Field 1640 (EVEX Byte 0, bits [7:0])—the first byte (EVEX Byte 0) is the format field 1640 and it contains 0x62 (the unique value used for distinguishing the vector friendly instruction format in one embodiment of the invention).

The second-fourth bytes (EVEX Bytes 1-3) include a number of bit fields providing specific capability.

REX field 1605 (EVEX Byte 1, bits [7-5])—consists of a EVEX.R bit field (EVEX Byte 1, bit [7]—R), EVEX.X bit field (EVEX byte 1, bit [6]—X), and 1557BEX byte 1, bit [5]—B). The EVEX.R, EVEX.X, and EVEX.B bit fields provide the same functionality as the corresponding VEX bit fields, and are encoded using 1s complement form, i.e. ZMM0 is encoded as 1611B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1605—this is the first part of the REX' field 1510 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1615 (EVEX byte 1, bits [3:0]—mmmm)—its content encodes an implied leading opcode byte (0F, 0F 38, or 0F 3).

Data element width field 1664 (EVEX byte 2, bit [7]—W)—is represented by the notation EVEX.W. EVEX.W is used to define the granularity (size) of the datatype (either 32-bit data elements or 64-bit data elements).

EVEX.vvvv 1620 (EVEX Byte 2, bits [6:3]-vvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved. Thus, EVEX.vvvv field 1620 encodes the 4 low-order bits of the first source register specifier stored in inverted (1s complement) form. Depending on the instruction, an extra different EVEX bit field is used to extend the specifier size to 32 registers.

EVEX.U 1668 Class field (EVEX byte 2, bit [2]-U)—If EVEX.U=0, it indicates class A or EVEX.U0; if EVEX.U=1, it indicates class B or EVEX.U1.

Prefix encoding field 1625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1654 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1670 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1630 (Byte 4) is also known as the opcode byte. Part of the opcode is specified in this field.

MOD R/M Field 1640 (Byte 5) includes MOD field 1642, Reg field 1644, and R/M field 1646. As previously described, the MOD field's 1642 content distinguishes between memory access and non-memory access operations. The role of Reg field 1644 can be summarized to two situations: encoding either the destination register operand or a source register operand, or be treated as an opcode extension and not used to encode any instruction operand. The role of R/M field 1646 may include the following: encoding the instruction operand that references a memory address, or encoding either the destination register operand or a source register operand.

Scale, Index, Base (SIB) Byte (Byte 6)—As previously described, the scale field's 1650 content is used for memory address generation. SIB.xxx 1654 and SIB.bbb 1656—the contents of these fields have been previously referred to with regard to the register indexes Xxxx and Bbbb.

Displacement field 1662A (Bytes 7-10)—when MOD field 1642 contains 10, bytes 7-10 are the displacement field 1662A, and it works the same as the legacy 32-bit displacement (disp32) and works at byte granularity.

Displacement factor field 1662B (Byte 7)—when MOD field 1642 contains 01, byte 7 is the displacement factor field 1662B. The location of this field is that same as that of the legacy x86 instruction set 8-bit displacement (disp8), which works at byte granularity. Since disp8 is sign extended, it can only address between −168 and 167 bytes offsets; in terms of 64 byte cache lines, disp8 uses 8 bits that can be set to only four really useful values −168, −64, 0, and 64; since a greater range is often needed, disp32 is used; however, disp32 requires 4 bytes. In contrast to disp8 and disp32, the displacement factor field 1662B is a reinterpretation of disp8; when using displacement factor field 1662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1662B substitutes the legacy x86 instruction set 8-bit displacement. Thus, the displacement factor field 1662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1672 operates as previously described.

Full Opcode Field

FIG. 16B is a block diagram illustrating the fields of the specific vector friendly instruction format 1600 that make up the full opcode field 1674 according to one embodiment of the invention. Specifically, the full opcode field 1674 includes the format field 1640, the base operation field 1642, and the data element width (W) field 1664. The base operation field 1642 includes the prefix encoding field 1625, the opcode map field 1615, and the real opcode field 1630.

Register Index Field

FIG. 16C is a block diagram illustrating the fields of the specific vector friendly instruction format 1600 that make up the register index field 1644 according to one embodiment of the invention. Specifically, the register index field 1644 includes the REX field 1605, the REX' field 1610, the MODR/M.reg field 1644, the MODR/M.r/m field 1646, the VVVV field 1620, xxx field 1654, and the bbb field 1656.

Augmentation Operation Field

Figure 16D:
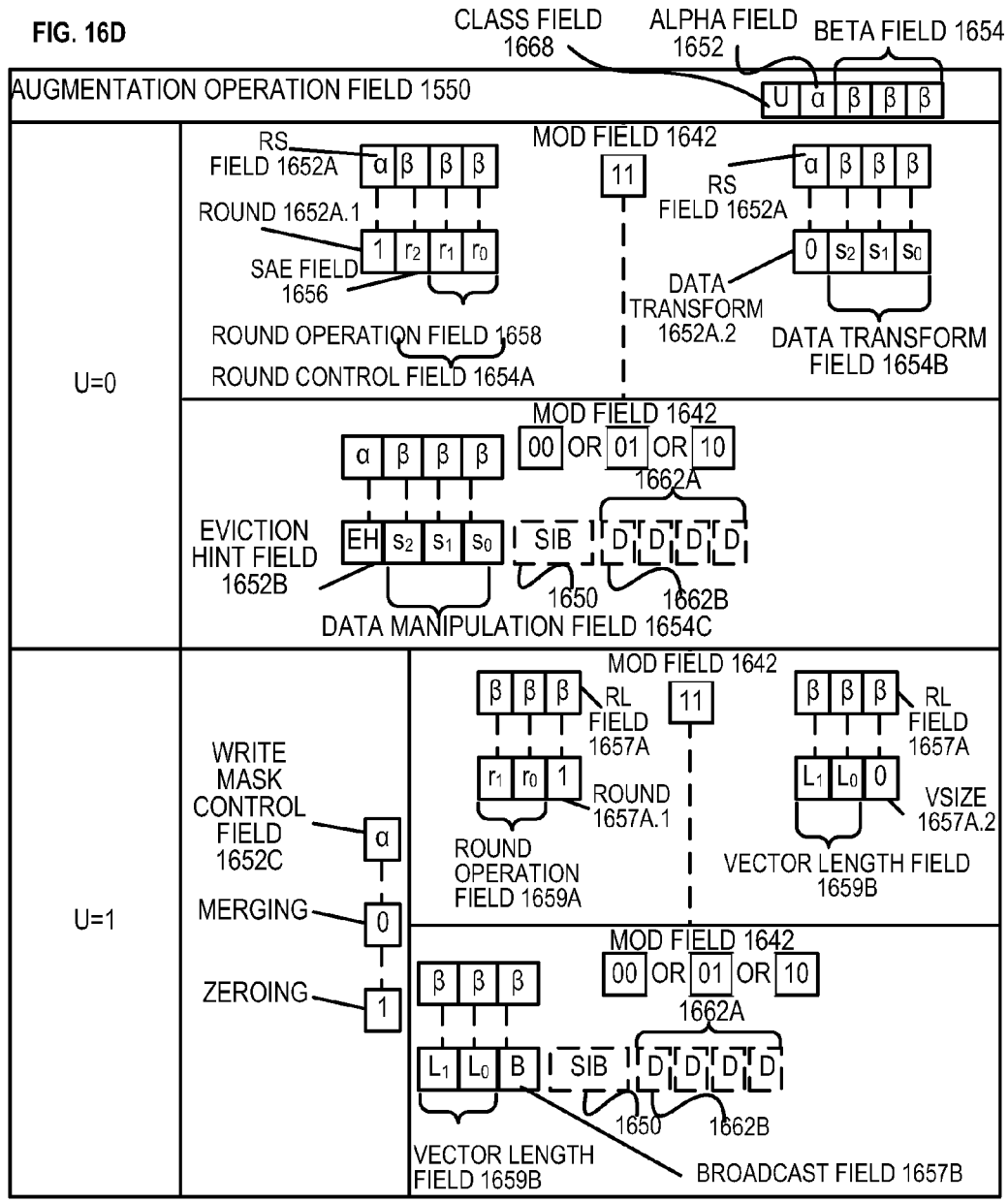

FIG. 16D is a block diagram illustrating the fields of the specific vector friendly instruction format 1600 that make up the augmentation operation field 1650 according to one embodiment of the invention. When the class (U) field 1668 contains 0, it signifies EVEX.U0 (class A 1668A); when it contains 1, it signifies EVEX.U1 (class B 1668B). When U=0 and the MOD field 1642 contains 11 (signifying a no memory access operation), the alpha field 1652 (EVEX byte 3, bit

[7]—EH) is interpreted as the rs field 1652A. When the rs field 1652A contains a 1 (round 1652A.1), the beta field 1654 (EVEX byte 3, bits [6:4]—SSS) is interpreted as the round control field 1654A. The round control field 1654A includes a one bit SAE field 1656 and a two bit round operation field 1658. When the rs field 1652A contains a 0 (data transform 1652A.2), the beta field 1654 (EVEX byte 3, bits [6:4]—SSS) is interpreted as a three bit data transform field 1654B. When U=0 and the MOD field 1642 contains 00, 01, or 10 (signifying a memory access operation), the alpha field 1652 (EVEX byte 3, bit [7]—EH) is interpreted as the eviction hint (EH) field 1652B and the beta field 1654 (EVEX byte 3, bits [6:4]—SSS) is interpreted as a three bit data manipulation field 1654C.

When U=1, the alpha field 1652 (EVEX byte 3, bit [7]—EH) is interpreted as the write mask control (Z) field 1652C. When U=1 and the MOD field 1642 contains 11 (signifying a no memory access operation), part of the beta field 1654 (EVEX byte 3, bit [4]—$S_0$) is interpreted as the RL field 1657A; when it contains a 1 (round 1657A.1) the rest of the beta field 1654 (EVEX byte 3, bit [6-5]—$S_{2-1}$) is interpreted as the round operation field 1659A, while when the RL field 1657A contains a 0 (VSIZE 1657.A2) the rest of the beta field 1654 (EVEX byte 3, bit [6-5]—$S_{2-1}$) is interpreted as the vector length field 1659B (EVEX byte 3, bit [6-5]—$L_{1-0}$). When U=1 and the MOD field 1642 contains 00, 01, or 10 (signifying a memory access operation), the beta field 1654 (EVEX byte 3, bits [6:4]—SSS) is interpreted as the vector length field 1659B (EVEX byte 3, bit [6-5]—$L_{1-0}$) and the broadcast field 1657B (EVEX byte 3, bit [4]—B).

Figure 17:
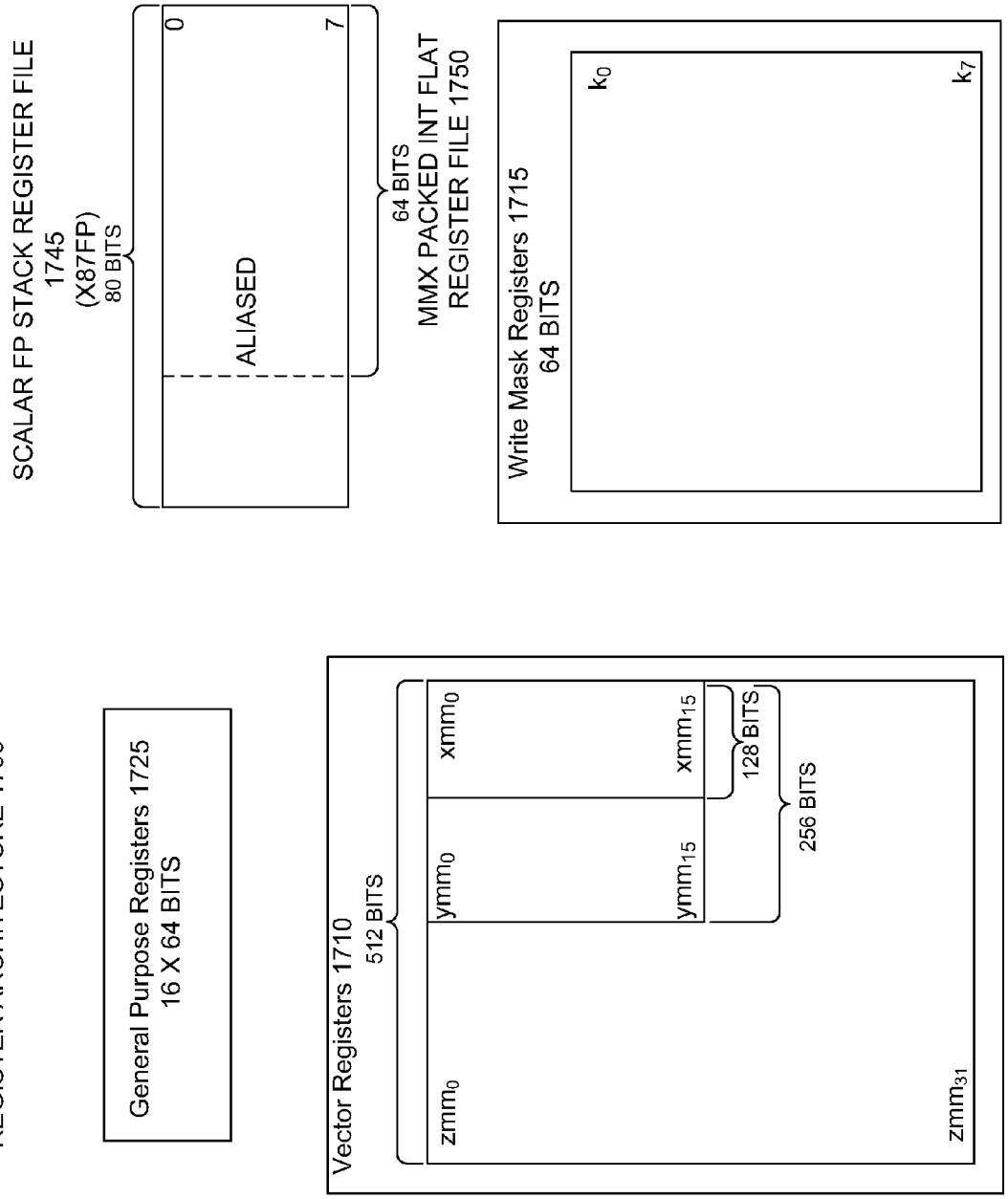
FIG. 17 is a block diagram of a register architecture according to one embodiment of the invention.

FIG. 17 is a block diagram of a register architecture 1700 according to one embodiment of the invention. In the embodiment illustrated, there are 32 vector registers 1710 that are 516 bits wide; these registers are referenced as zmm0 through zmm31. The lower order 256 bits of the lower 16 zmm registers are overlaid on registers ymm0-16. The lower order 168 bits of the lower 16 zmm registers (the lower order 168 bits of the ymm registers) are overlaid on registers xmm0-15. The specific vector friendly instruction format 1600 operates on these overlaid register file as illustrated in the below tables.

| Adjustable Vector Length | Class | Operations | Registers |
|---|---|---|---|
| Instruction Templates that do not include the vector length field 1559B | A (FIG. 16A; U = 0) | 1510, 1515, 1525, 1530 | zmm registers (the vector length is 64 byte) |
| | B (FIG. 16B; U = 1) | 1516 | zmm registers (the vector length is 64 byte) |
| Instruction Templates that do include the vector length field 1559B | B (FIG. 16B; U = 1) | 1517, 1527 | zmm, ymm, or xmm registers (the vector length is 64 byte, 32 byte, or 16 byte) depending on the vector length field 1559B |

In other words, the vector length field 1559B selects between a maximum length and one or more other shorter lengths, where each such shorter length is half the length of the preceding length; and instructions templates without the vector length field 1559B operate on the maximum vector length. Further, in one embodiment, the class B instruction templates of the specific vector friendly instruction format 1600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1715—in the embodiment illustrated, there are 8 write mask registers (k0 through k7), each 64 bits in size. In an alternate embodiment, the write mask registers 1715 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1745, on which is aliased the MMX packed integer flat register file 1750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a first set of one or more physical processor cores having first processing characteristics;
   a second set of one or more physical processor cores having second processing characteristics different from the first processing characteristics;
   logic to determine that a number of active processor cores from the second set is below a first threshold; and
   virtual-to-physical (V-P) mapping logic to expose a plurality of virtual processors to software, the plurality of virtual processors to appear to the software as a plurality of homogeneous processor cores, the software to allocate threads to the virtual processors as if the virtual processors were homogeneous processor cores;
   wherein the V-P mapping logic is to map each virtual processor to a physical processor core within the first set of physical processor cores or the second set of physical processor cores such that a thread allocated to a first virtual processor by the software is executed by a physical processor core mapped to the first virtual processor from the first set or the second set of physical processor cores, wherein the V-P mapping logic is to remap at least one virtual processor from mapping to one physical processor core within the second set to mapping to one physical processor core within the first set based on the determination, and wherein the mapping and remapping is performed without being based on input from an operating system of the processor.

2. The processor as in claim 1 wherein the processing characteristics include processing performance and/or power characteristics of the physical processor cores.

3. The processor as in claim 2 wherein the first set of physical processor cores have a relatively higher processing performance relative to the second set of physical processor cores.

4. The processor as in claim 3 wherein processor cores from the first set are made visible to the software through a default mapping between virtual processors and physical processor core from the first set.

5. The processor as in claim 4 wherein processor cores from the second set are hidden from the software and made accessible to the software only by the mapping performed by the V-P mapping logic.

6. The processor as in claim 3 wherein processor cores from the second set are made visible to the software through a default mapping between virtual processors and physical processor core from the first set.

7. The processor as in claim 6 wherein processor cores from the first set are hidden from the software and made accessible to the software only by the mapping performed by the V-P mapping logic.

8. The processor as in claim 1 wherein the V-P mapping logic operates in accordance with a set of mapping rules.

9. The processor as in claim 8 wherein the mapping rules are programmable and may be dynamically updated.

10. The processor as in claim 1 further comprising:
    logic to monitor current operating conditions associated with the processor;
    wherein the V-P mapping logic is to map each virtual processor to a physical processor core within either the first set of physical processor cores or the second set of physical processor cores based on the current operating conditions.

11. The processor as in claim 10 wherein the current operating conditions comprise current power usage of the processor in view of a specified power budget, temperature, instructions-per-clock, utilization, or other internal performance metrics, wherein the V-P mapping logic is to map each virtual processor to a physical processor core within either the first set of physical processor cores or the second set of physical processor cores such that the power budget is maintained.

12. The processor as in claim 1 further comprising:
    N additional sets of one or more physical processor cores having a corresponding N additional processing characteristics different from the first and second processing characteristics; and
    wherein the V-P mapping logic is to map each virtual processor to a physical processor core within the first set, second set or one of the N additional sets of physical processor cores such that a thread allocated to a first virtual processor by software is executed by a physical processor core mapped to the first virtual processor from the first set, second set, or one of the N additional sets of physical processor cores.

13. A method implemented in a processor, comprising:
    providing a first set of one or more physical processor cores having first processing characteristics;
    providing a second set of one or more physical processor cores having second processing characteristics different from the first processing characteristics;
    exposing a plurality of virtual processors to software, the plurality of virtual processors to appear to the software as a plurality of homogeneous processor cores, the software to allocate threads to the virtual processors as if the virtual processors were homogeneous processor cores;
    mapping each virtual processor to a physical processor core within the first set of physical processor cores or the second set of physical processor cores such that a thread allocated to a first virtual processor by the software is executed by a physical processor core mapped to the first virtual processor from the first set or the second set of physical processor cores;
    determining that a number of active processor cores from the second set is below a first threshold; and
    remapping at least one virtual processor from mapping to one physical processor core within the second set to mapping to one physical processor core within the first set based on the determination, wherein the mapping and remapping is performed without being based on input from an operating system of the processor.

14. The method as in claim 13 wherein the processing characteristics include processing performance and/or power characteristics of the physical processor cores.

15. The method as in claim 14 wherein the first set of physical processor cores have a relatively higher processing performance relative to the second set of physical processor cores.

16. The method as in claim 15 wherein processor cores from the first set are made visible to the software through a default mapping between virtual processors and physical processor core from the first set.

17. The method as in claim 16 wherein processor cores from the second set are hidden from the software and made accessible to the software only by the mapping.

18. The method as in claim 15 wherein processor cores from the second set are made visible to the software through a default mapping between virtual processors and physical processor core from the first set.

19. The method as in claim 18 wherein processor cores from the first set are hidden from the software and made accessible to the software only by the mapping.

20. The method as in claim 13 wherein the mapping each virtual processor to the physical processor core operates in accordance with a set of mapping rules.

21. The method as in claim 20 wherein the mapping rules are programmable and may be dynamically updated.

22. The method as in claim 13 further comprising:
monitoring current operating conditions associated with the processor;
wherein each virtual processor is to be mapped to a physical processor core within either the first set of physical processor cores or the second set of physical processor cores based on the current operating conditions.

23. The method as in claim 22 wherein the current operating conditions comprise current power usage of the processor in view of a specified power budget, wherein each virtual processor is to be mapped to a physical processor within either the first set of physical processor cores or the second set of physical processor cores such that the power budget is maintained.

24. The method as in claim 13 further comprising:
providing N additional sets of one or more physical processor cores having a corresponding N additional processing characteristics different from the first and second processing characteristics; and
wherein each virtual processor is to be mapped to a physical processor core within the first set, second set or one of the N additional sets of physical processor cores such that a thread allocated to a first virtual processor by software is executed by a physical processor core mapped to the first virtual processor from the first set, second set, or one of the N additional sets of physical processor cores.

25. The method as in claim 24 wherein the processing characteristics include processing performance and/or power characteristics of the physical processor cores.

* * * * *